US011161088B2

(12) United States Patent
Rentsch et al.

(10) Patent No.: US 11,161,088 B2
(45) Date of Patent: *Nov. 2, 2021

(54) O2 SCAVENGING CACO3 TREATMENT

(71) Applicant: Omya International AG, Oftringen (CH)

(72) Inventors: Samuel Rentsch, Spiegel bei Bern (CH); Matthias Welker, Hésingue (FR); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 204 days.

This patent is subject to a terminal disclaimer.

(21) Appl. No.: 15/780,501

(22) PCT Filed: Jan. 12, 2017

(86) PCT No.: PCT/EP2017/050522
§ 371 (c)(1),
(2) Date: May 31, 2018

(87) PCT Pub. No.: WO2017/121774
PCT Pub. Date: Jul. 20, 2017

(65) Prior Publication Data
US 2018/0353930 A1    Dec. 13, 2018

Related U.S. Application Data

(60) Provisional application No. 62/311,046, filed on Mar. 21, 2016.

(30) Foreign Application Priority Data

Jan. 14, 2016 (EP) .................... 16151387

(51) Int. Cl.
*B01J 20/04* (2006.01)
*C09K 15/00* (2006.01)
(Continued)

(52) U.S. Cl.
CPC .......... *B01J 20/043* (2013.01); *A23L 3/3436* (2013.01); *B01D 53/02* (2013.01);
(Continued)

(58) Field of Classification Search
CPC ... A23L 3/3436; A23V 2002/00; B01D 53/02; B01D 53/8615; B01D 2251/606;
(Continued)

(56) References Cited

U.S. PATENT DOCUMENTS 4,524,015 A    6/1985  Takahashi et al.
5,977,212 A *  11/1999  Ebner .................. B65D 81/266
                                                523/210
(Continued)

FOREIGN PATENT DOCUMENTS

CA    2943499 A1   10/2015
EP    0320085 B1    6/1989
(Continued)

OTHER PUBLICATIONS

Poompradub et al, Improving Oxidation Stability and Mechanical Properties of Natural Rubber Vulcanizates filled with Calcium Carbonate modified by Gallic Acid, 2011, Polym. Bull., 66, pp. 965-977. (Year: 2011).*
(Continued)

*Primary Examiner* — Trevor Love
(74) *Attorney, Agent, or Firm* — ALGM LLP; Harry J. Guttman

(57) ABSTRACT

The present invention refers to the use of a surface-treated calcium carbonate-comprising material and/or magnesium carbonate-comprising material as oxygen scavenger;
(Continued)

Figure 1:
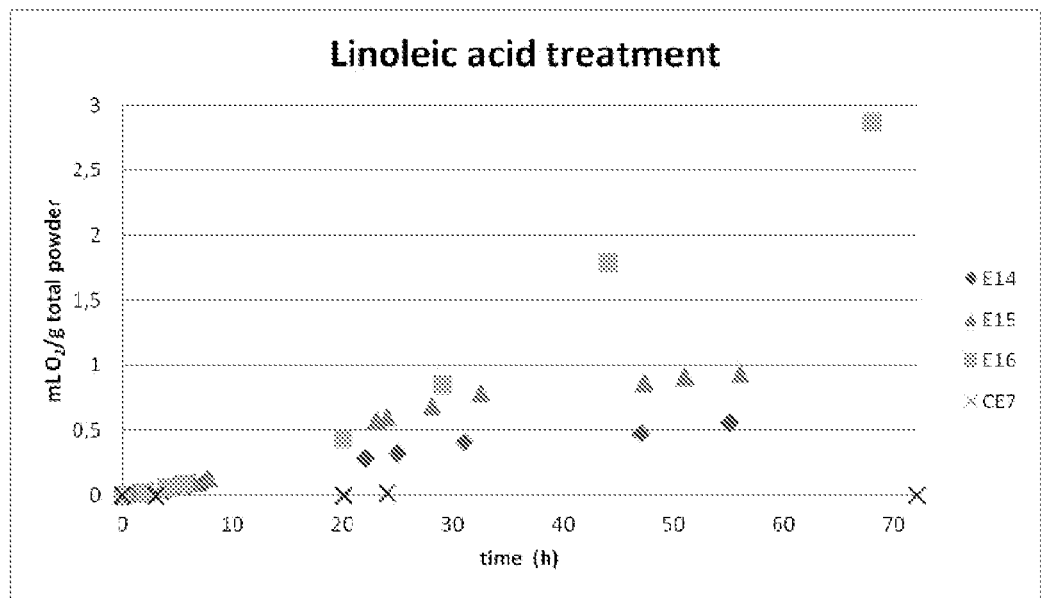

wherein the surface treatment agent is selected from the group consisting of ascorbic acid and/or salts thereof, gallic acid and/or salts thereof, unsaturated fatty acids and/or salts thereof, elemental iron, iron (II)-salts and iron (ID-comprising oxides, iron (II, III)-comprising oxides and mixtures thereof; and wherein the total weight of the surface treatment agent on the total surface area of the at least one calcium carbonate-comprising material and/or magnesium carbonate-comprising material is from 0.01 to 40 mg/m$^2$, based on the at least one calcium carbonate-comprising material and/or magnesium carbonate-comprising material.

20 Claims, 5 Drawing Sheets

(51) Int. Cl.
| | |
|---|---|
| B01D 53/86 | (2006.01) |
| B01J 20/30 | (2006.01) |
| B01J 20/28 | (2006.01) |
| B01J 20/22 | (2006.01) |
| B01J 20/26 | (2006.01) |
| C08K 3/26 | (2006.01) |
| D21H 19/42 | (2006.01) |
| D21H 21/38 | (2006.01) |
| B01D 53/02 | (2006.01) |
| A23L 3/3436 | (2006.01) |
| B65D 81/26 | (2006.01) |
| C09C 1/02 | (2006.01) |
| C08K 9/04 | (2006.01) |
| C08K 9/02 | (2006.01) |

(52) U.S. Cl.
CPC .......... *B01D 53/8615* (2013.01); *B01J 20/22* (2013.01); *B01J 20/223* (2013.01); *B01J 20/261* (2013.01); *B01J 20/28007* (2013.01); *B01J 20/28016* (2013.01); *B01J 20/28057* (2013.01); *B01J 20/28059* (2013.01); *B01J 20/28061* (2013.01); *B01J 20/3085* (2013.01); *B65D 81/266* (2013.01); *C08K 3/26* (2013.01); *C09C 1/021* (2013.01); *C09K 15/00* (2013.01); *D21H 19/42* (2013.01); *D21H 21/38* (2013.01); *A23V 2002/00* (2013.01); *B01D 2251/606* (2013.01); *B01D 2253/112* (2013.01); *B01D 2253/1124* (2013.01); *B01D 2253/20* (2013.01); *B01D 2253/304* (2013.01); *B01D 2253/306* (2013.01); *B01D 2255/20738* (2013.01); *B01D 2257/104* (2013.01); *B01D 2258/06* (2013.01); *C01P 2004/61* (2013.01); *C01P 2004/62* (2013.01); *C01P 2004/64* (2013.01); *C01P 2006/12* (2013.01); *C08K 9/02* (2013.01); *C08K 9/04* (2013.01); *C08K 2003/265* (2013.01); *C08K 2201/005* (2013.01); *C08K 2201/006* (2013.01)

(58) Field of Classification Search
CPC ...... B01D 2253/112; B01D 2253/1124; B01D 2253/20; B01D 2253/304; B01D 2253/306; B01D 2255/20738; B01D 2257/104; B01D 2258/06; B01J 20/043; B01J 20/22; B01J 20/223; B01J 20/261; B01J 20/28007; B01J 20/28016; B01J 20/28057; B01J 20/28059; B01J 20/28061; B01J 20/3085; B65D 81/266; C01P 2004/61; C01P 2004/62; C01P 2004/64; C01P 2006/12; C08K 3/26; C08K 9/02; C08K 9/04; C08K 2003/265; C08K 2201/005; C08K 2201/006; C09C 1/021; C09C 1/022; C09C 1/028; C09K 15/00; C09K 15/02; D21H 19/42; D21H 21/38

See application file for complete search history.

(56) References Cited

U.S. PATENT DOCUMENTS

| | | |
|---|---|---|
| 6,666,953 B1 | 12/2003 | Gane et al. |
| 2002/0102404 A1 | 8/2002 | Nakai et al. |
| 2004/0020410 A1 | 2/2004 | Gane et al. |
| 2004/0097616 A1 | 5/2004 | Hoppler et al. |
| 2008/0022901 A1* | 1/2008 | Buri .............. C09C 1/021 106/471 |
| 2014/0288224 A1 | 9/2014 | Gijsman et al. |

FOREIGN PATENT DOCUMENTS

| | | | |
|---|---|---|---|
| EP | 1550506 A1 | 7/2005 | |
| EP | 1916276 A1 | 4/2008 | |
| EP | 2264108 A1 | 12/2010 | |
| EP | 2264109 A1 | 12/2010 | |
| EP | 2371766 A1 | 10/2011 | |
| EP | 2390285 A1 | 11/2011 | |
| EP | 2447213 A1 | 5/2012 | |
| EP | 2447328 A1 | 5/2012 | |
| EP | 2524898 A1 | 11/2012 | |
| EP | 2722368 A1 | 4/2014 | |
| EP | 2770017 A1 | 8/2014 | |
| EP | 2840065 A1 | 2/2015 | |
| EP | 2966129 A1 | 1/2016 | |
| EP | 2421508 B1 | 12/2016 | |
| WO | WO1992002587 | * 2/1992 | .............. C09C 1/02 |
| WO | 00/39222 A1 | 7/2000 | |
| WO | 2004/083316 A1 | 9/2004 | |
| WO | 2005/121257 A2 | 12/2005 | |
| WO | 2008/125955 A1 | 10/2008 | |
| WO | 2009/074492 A1 | 6/2009 | |
| WO | 2010/038064 A1 | 4/2010 | |
| WO | 2010/146531 A1 | 12/2010 | |
| WO | 2013142473 A1 | 9/2013 | |
| WO | 2015/124494 A1 | 8/2015 | |

OTHER PUBLICATIONS

The International Search Report dated Feb. 22, 2017 from PCT/EP2017/050522.
The Written Opinion of the International Searching Authority dated Feb. 22, 2017 from PCT/EP2017/050522.
International Search Report from PCT/EP2017/050184, dated Feb. 2, 2017, 4 pages.
Written Opinion from PCT/EP2017/050184, dated Feb. 2, 2017, 8 pages.
Gane et al. (1996) "Void Space Structure of Compressible Polymer Spheres and Consolidated Calcium Carbonate Paper-Coating Formulations" Ind. Eng. Chem. Res., vol. 35, pp. 1753-1764.
Nonfinal Office action in U.S. Appl. No. 15/780,831 dated Sep. 21, 2020, 24 pages.
Response to nonfinal Office action in U.S. Appl. No. 15/780,831 dated Dec. 6, 2020, 16 pages.
Final Office action in U.S. Appl. No. 15/780,831 dated Mar. 29, 2021, 29 pages.

* cited by examiner

O2 SCAVENGING CACO3 TREATMENT

CROSS-REFERENCE TO RELATED APPLICATIONS

This is a U.S. national phase of PCT Application No. PCT/EP2017/050522, filed Jan. 12, 2017, which claims priority to U.S. Provisional Application No. 62/311,046, filed Mar. 21, 2016 and European Application No. 16151387.4, filed Jan. 14, 2016.

The present application relates to the use of a surface-treated calcium carbonate-comprising material and/or magnesium carbonate-comprising material as oxygen scavenger.

A great variety of methods are known such as freeze storage, cold storage, vacuum packaging and packaging under inert atmosphere for reducing or preventing the formation and/or the growth of oomycetes, bacteria and higher organism such as insects that tend to disturb the preservation of foodstuffs. However, most of the oomycetes, bacteria and higher organisms need oxygen for their development and growth. Therefore, one well-suited method in food applications to prevent the foodstuff from getting mouldy and rotting is to use oxygen scavengers or oxygen absorbents to absorb or "capture" oxygen from the surrounding, e.g. a gaseous surrounding. For example, such oxygen scavengers are used in food applications, especially food packaging applications, in order to prevent foodstuffs like vegetables, fruits, meat and fish, cheese or processed foods like bread and pastries, chips, peanuts or ready-made meals from becoming mouldy and rotten.

Another application is in the field of cosmetics. Cremes, gels or serums, but also make-up, powders etc., are used on the body or skin of humans. Many active substances that are incorporated therein can be destroyed by oxidation and, therefore, it is desirable that these cosmetics are packaged and sold such that a relative low amount of oxygen comes in contact with the active substances. This is possible if oxygen scavengers or oxygen absorbents are used in the cosmetics or cosmetic packaging to absorb or "capture" oxygen from the surrounding, e.g. a gaseous surrounding.

Another application is the protection of packaged metal items. One problem of metal items is the corrosion that is a reaction of the metal with an oxidant such as oxygen that leads to an electrochemical oxidation of the metal, also known in the case of iron as rusting. Therefore, it is desirably to package the metal items together with oxygen scavengers or oxygen absorbents that absorb or "capture" oxygen from the surrounding such that oxidation of the metal item is prevented.

Various materials are known to the skilled person that comprise oxygen scavenging or adsorbing properties. For example, U.S. Pat. No. 4,524,015 refers to granular oxygen absorbents comprising at least one ascorbic compound selected from ascorbic acid, ascorbic acid salts and mixtures thereof, an alkali metal carbonate, an iron compound, carbon black and water. The granular oxygen absorbents are produced by mixing the compounds and blending them, for example, in a granulating machine.

EP 1 916 276 refers to a packaging material comprising metal-protecting components including a volatile corrosion inhibitor, a desiccant and an oxygen scavenger. The oxygen scavenger may comprise a triazole, for example, a benzotriazole.

US 2014/0288224 refers to non-fibrous-reinforced thermoplastic moulding compositions. The compositions comprise an elementary metal, for example, iron, as oxygen scavenger.

EP 0 320 085 refers to oxygen scavenger for boiled water and method of use. The oxygen scavenger includes ascorbic acid neutralized with diethylaminoethanol.

However, it is not only important that the materials that are used as oxygen scavengers are cheap, non-toxic and easy available materials but they also have to provide highly efficient oxygen ($O_2$) scavenging.

In view of the foregoing, there is a continuous need for materials that can be used as oxygen scavengers that have improved properties in comparison to materials of the prior art that are already used as oxygen scavengers.

Accordingly, it is an object of the present invention to provide materials that can be used as oxygen scavengers that provide a highly efficient oxygen ($O_2$) scavenging. Especially, it is an object of the present invention to provide materials that can be used as oxygen scavengers that provide an improved oxygen ($O_2$) scavenging in comparison to already known oxygen scavenger materials.

It is also an object of the present invention to provide materials that can be used as oxygen scavengers that are non-toxic and can be easy handled.

It is also an object of the present invention to provide materials that can be used as oxygen scavengers that provide a long lasting oxygen ($O_2$) scavenging effect and/or are capable of removing a high amount of oxygen from the surrounding per unit addition of the scavenger. Another object of the present invention is to provide materials with high oxygen scavenging efficiency. Another object of the present invention is to reduce the amount of active material needed for achieving a good oxygen scavenging activity.

The foregoing and other objects are solved by the subject-matter as defined herein in the independent claim.

According to one aspect of the present invention, a use of a surface-treated calcium carbonate-comprising material and/or magnesium carbonate-comprising material as oxygen scavenger is provided; wherein the surface treatment agent is selected from the group consisting of ascorbic acid and/or salts thereof, gallic acid and/or salts thereof, unsaturated fatty acids and/or salts thereof, elemental iron, iron (II)-salts and iron (II)-comprising oxides, iron (II, III)-comprising oxides and mixtures thereof; and wherein the total weight of the surface treatment agent on the total surface area of the at least one calcium carbonate-comprising material and/or magnesium carbonate-comprising material is from 0.01 to 40 mg/m$^2$, based on the at least one calcium carbonate-comprising material and/or magnesium carbonate-comprising material.

Advantageous embodiments of the present invention are defined in the corresponding sub-claims.

According to one embodiment the calcium carbonate-comprising material and/or magnesium carbonate-comprising material is selected from the group consisting of ground calcium carbonate, preferably marble, limestone and/or chalk, precipitated calcium carbonate, preferably vaterite, calcite and/or aragonite, dolomite, and mixtures thereof, more preferably the at least one calcium carbonate-comprising material and/or magnesium carbonate-comprising material is selected from the group consisting of dolomitic marble, magnesitic marble, limestone, chalk, and mixtures thereof, and most preferably the at least one calcium carbonate-comprising material and/or magnesium carbonate-comprising material is ground calcium carbonate.

According to one embodiment the specific surface area (BET) of the least one calcium carbonate-comprising material and/or magnesium carbonate-comprising material is from 0.5 to 150 m$^2$/g, preferably from 1 to 60 m$^2$/g, and more preferably from 1.5 to 15 m²/g, as measured using nitrogen and the BET method according to ISO 9277:2010.

According to one embodiment the total weight of the surface treatment agent on the total surface area of the at least one surface-treated calcium carbonate-comprising material and/or magnesium carbonate-comprising material is from 0.1 to 40 mg/m², preferably from 0.5 to 20 mg/m² and more preferably from 0.7 to 15 mg/m², based on the at least one calcium carbonate-comprising material and/or magnesium carbonate-comprising material.

According to one embodiment the moisture pick up susceptibility of the surface-treated calcium carbonate-comprising material and/or magnesium carbonate-comprising material is from 0.05 to 20 mg/g, preferably from 0.1 to 15 mg/g and more preferably from 0.2 to 10 mg/g.

According to one embodiment the unsaturated fatty acid is selected from the group consisting of oleic acid, linoleic acid, linolenic acid, crotonic acid, myristoleic acid, palmitoleic acid, sapienic acid, elaidic acid, vaccenic acid, gadoleic acid, erucic acid, nervonic acid, ecosadienoic acid, docosadienoic acid, pinoleic acid, eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, salts of these acids and mixtures thereof, preferably the unsaturated fatty acid is oleic acid or linoleic acid.

According to one embodiment the iron is a particulate powder iron having a volume median particle size $d_{50}$ ranging from 5 nm to 10 μm, preferably from 10 nm to 2 μm, and more preferably from 30 nm to 500 nm.

According to one embodiment the calcium carbonate-comprising material and/or magnesium carbonate-comprising material is additionally treated with another additive, preferably with a dispersant, for example a polyacrylate dispersant, a binder and/or an activating agent, more preferably with a binder and/or an activating agent.

According to one embodiment the total volume of oxygen reacted per gram of surface treatment agent is in the range from 0.01 to 10 mL per gram of surface treatment agent per day and preferably in the range from 0.1 to 8 mL per gram of surface treatment agent per day and more preferably in the range from 0.4 to 6 mL per gram of surface treatment agent per day, wherein the reaction with oxygen is carried out with 500 g dried surface-treated calcium carbonate-comprising material and/or magnesium carbonate-comprising material in a closed desiccator with a volume of 7 L filled with air under normal pressure.

According to one embodiment the surface-treated calcium carbonate-comprising material and/or magnesium carbonate-comprising material further comprises at least one supplemental agent which is a hydrophobising agent, which at least partially covers the surface-treated calcium carbonate-comprising material and/or magnesium carbonate-comprising material, wherein the total weight of the at least one hydrophobising agent on the total surface area of the surface-treated material is from 0.001 to 10 mg/m², preferably from 0.001 to 9 mg/m², more preferably from 0.01 to 8 mg/m², and most preferably from 0.1 to 4 mg/m², based on the at least one calcium carbonate-comprising material and/or magnesium carbonate-comprising material.

According to one embodiment the surface-treated calcium carbonate-comprising material and/or magnesium carbonate-comprising material comprises at least one supplemental agent which is a hydrophobising agent selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, polyhydrogensiloxane and reaction products thereof, an inert silicone oil, preferably polydimethylsiloxane, and mixtures thereof.

According to one embodiment the surface-treated calcium carbonate-comprising material and/or magnesium carbonate-comprising material is used as oxygen scavenger in polymer compositions, coatings, preferably polymer or paper coatings, more preferably paper coatings, food applications, filters and/or cosmetic applications, preferably in food applications and more preferably in food packaging applications.

It should be understood that for the purpose of the present invention the following terms have the following meaning.

A "calcium carbonate-comprising material" in the meaning of the present invention refers to a material which is a source of calcium carbonate and preferably is selected from ground calcium carbonate, precipitated calcium carbonate, dolomite and mixtures thereof. The "calcium carbonate-comprising material" of the present invention is not a "surface-reacted calcium carbonate" which is defined as a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source. A $H_3O^+$ ion donor is a Brønsted acid and/or an acid salt.

A "magnesium carbonate-comprising material" in the meaning of the present invention refers to a material which is a source of magnesium carbonate.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example, by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation from a calcium and a carbonate source in water. Additionally, precipitated calcium carbonate can also be the product of introducing calcium and carbonate salts, calcium chloride and sodium carbonate for example, in an aqueous environment. PCC may have a vateritic, calcitic or aragonitic crystalline form. PCCs are described, for example, in EP 2 447 213 A1, EP 2 524 898 A1, EP 2 371 766 A1, EP 2 840 065 A1, or WO 2013/142473 A1.

The term "dry" or "dried" material is understood to be a material having between 0.001 to 20 wt.-% of water, based on the total weight of the surface-treated calcium carbonate-comprising material and/or magnesium carbonate-comprising material weight. The % water (equal to "moisture content") is determined gravimetrically. "Drying" in the sense of the present invention means that heating is carried out until the moisture content of the surface-treated calcium carbonate-comprising material and/or magnesium carbonate-comprising material is in the range from 0.001 to 20% by weight, based on the total weight of the surface-treated calcium carbonate-comprising material and/or magnesium carbonate-comprising material weight.

The "particle size" of particulate materials, for example the calcium carbonate-comprising material and/or magnesium carbonate-comprising material herein is described by its distribution of particle sizes $d_x$. Therein, the value $d_x$ represents the diameter relative to which x% by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. Particle sizes were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

The volume median grain diameter $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

A "specific surface area (SSA)" of a calcium carbonate-comprising material and/or magnesium carbonate-comprising material in the meaning of the present invention is defined as the surface area of the calcium carbonate-comprising material and/or magnesium carbonate-comprising material divided by its mass. As used herein, the specific surface area is measured by nitrogen gas adsorption using the BET isotherm (ISO 9277:2010) and is specified in $m^2/g$.

The term "surface area" or "outer surface" in the meaning of the present invention refers to the surface of the calcium carbonate-comprising material and/or magnesium carbonate-comprising material particle that is accessible for nitrogen as used for measuring the BET according to ISO 9277:2010. In this regard, it should be noted that the amount of surface-treatment agent according to claim 1 required for full saturation of the surface area is defined as a monolayer concentration. Higher concentrations thus can be chosen by forming bilayered or multi-layered structures on the surface of the calcium carbonate-comprising material particle.

For the purpose of the present invention, the term "viscosity" or "Brookfield viscosity" refers to Brookfield viscosity. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 μm pore size at 20° C. to recover the liquid filtrate, provide more than 0.1 g of recovered solid material following evaporation at 95 to 100° C. of 100 g of said liquid filtrate at ambient pressure.

A "suspension" or "slurry" in the meaning of the present invention comprises insoluble solids and a solvent or liquid, preferably water, and optionally further additives, and usually contains large amounts of solids and, thus, is more viscous and can be of higher density than the liquid from which it is formed.

The term "surface-treatment agent" according to the present invention is an agent that is used to treat the surface of the at least one calcium carbonate-comprising material and/or magnesium carbonate-comprising material. The surface-treatment agent of the present invention is selected from the group consisting of ascorbic acid and/or salts thereof, gallic acid and/or salts thereof, unsaturated fatty acids and/or salts thereof, elemental iron, iron (II)-salts and iron (II)-comprising oxides, iron (II, III)-comprising oxides and mixtures thereof.

A "surface-treated calcium carbonate-comprising material and/or magnesium carbonate-comprising material" in the gist of the present invention comprises at least a calcium carbonate-comprising material and/or magnesium carbonate-comprising material which has been contacted with at least one surface-treatment agent according to the present invention such as to obtain a treatment layer located on at least a part of the surface of the calcium carbonate-comprising material and/or magnesium carbonate-comprising material. Accordingly, the term "treatment layer" refers to a layer comprising the surface treatment agent and reaction products thereof on at least a part of the surface of the calcium carbonate-comprising material and/or magnesium carbonate-comprising material. The term "reaction products" in the meaning of the present invention refers to products obtained by contacting the at least one calcium carbonate-comprising material and/or magnesium carbonate-comprising material with at least one surface-treatment agent according to the present invention.

An "oxygen scavenger" or "oxygen absorber" according to the present invention is able to absorb or "capture" oxygen from the surrounding atmosphere.

The term "absorber" according to the present invention refers to the ability to "scavenge" and maintain retention of the scavenged material over time in isolation, being independent of any material concentration gradient mechanism, and dependent only on absorption saturation. The term "absorption" in the context of this invention includes the physicochemical mechanisms of absorption and adsorption.

The term "solid" according to the present invention refers to a material that is solid under standard ambient temperature and pressure (SATP) which refers to a temperature of 298.15 K (25° C.) and an absolute pressure of exactly 100 000 Pa (1 bar, 14.5 psi, 0.98692 atm). The solid may be in the form of a powder, tablet, granules, flakes etc.

The term "ambient pressure" according to the present invention refers to the standard ambient temperature pressure (SATP) which refers to an absolute pressure of exactly 100 000 Pa (1 bar, 14.5 psi, 0.98692 atm). The term "reduced pressure" refers to a pressure below the "ambient pressure".

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention it has been found that a calcium carbonate-comprising material and/or magnesium carbonate-comprising material, which has been surface treated in a certain way, can be used as oxygen scavenger. Thus, according to the present invention the use of a surface-treated calcium carbonate-comprising material and/or magnesium carbonate-comprising material as oxygen scavenger is provided, wherein the surface treatment agent is selected from the group consisting of ascorbic acid and/or salts thereof, gallic acid and/or salts thereof, unsaturated fatty acids and/or salts thereof, elemental iron, iron (II)-salts and iron (II)-comprising oxides, iron (II, III)-comprising oxides and mixtures thereof; and wherein the total weight of the surface treatment agent on the total surface area of the at least one calcium carbonate-comprising material and/or magnesium carbonate-comprising material is from 0.01 to 40 mg/m$^2$, based on the at least one calcium carbonate-comprising material and/or magnesium carbonate-comprising material.

In the following the details and preferred embodiments of the inventive use of the surface-treated calcium carbonate-comprising material and/or magnesium carbonate-comprising material as oxygen scavenger will be set out in more detail.

The surface-treated calcium carbonate-comprising material and/or magnesium carbonate-comprising material used according to the present invention is a calcium carbonate-comprising material and/or magnesium carbonate-comprising material that has been surface-treated with a surface treatment agent. In the following the calcium carbonate-comprising material and/or magnesium carbonate-comprising material as well as the surface-treatment agent will be defined in more detail The Calcium Carbonate-Comprising Material and/or Magnesium Carbonate-Comprising Material According to one embodiment of the present invention the surface-treated calcium carbonate-comprising material and/or magnesium carbonate-comprising material comprises at least one calcium carbonate-comprising material and/or magnesium carbonate-comprising material.

The expression "at least one" calcium carbonate-comprising material and/or magnesium carbonate-comprising material means that one or more, for example, two or three calcium carbonate-comprising materials and/or magnesium carbonate-comprising materials may be present in the surface-treated calcium carbonate-comprising material and/or magnesium carbonate-comprising material. According to a preferred embodiment only one calcium carbonate-comprising material and/or magnesium carbonate-comprising material is present in the surface-treated calcium carbonate-comprising material and/or magnesium carbonate-comprising material.

According to one embodiment of the present invention the "calcium carbonate-comprising material and/or magnesium carbonate-comprising material" can be a mineral material or a synthetic material having a content of calcium and/or magnesium carbonate of at least 30 wt.-%, preferably 40 wt.-% more preferably 50 wt.-%, even more preferably 75 wt.-%, even more preferably 90 wt.-%, and most preferably 95 wt.-%, based on the total dry weight of the calcium carbonate-comprising material and/or magnesium carbonate-comprising material.

According to one embodiment of the present invention the surface-treated calcium carbonate-comprising material and/or magnesium carbonate-comprising material comprises a calcium and magnesium carbonate-comprising material. According to another embodiment of the present invention the surface-treated calcium carbonate-comprising material and/or magnesium carbonate-comprising material comprises a calcium carbonate-comprising material. According to another embodiment of the present invention the surface-treated calcium carbonate-comprising material and/or magnesium carbonate-comprising material comprises a magnesium carbonate-comprising material.

According to one embodiment the at least one calcium carbonate-comprising material consists of calcium carbonate. According to a preferred embodiment the at least one calcium carbonate-comprising material consists of calcium carbonate.

The at least one calcium carbonate-comprising material and/or magnesium carbonate-comprising material is preferably in the form of a particulate material. According to one embodiment of the present invention the at least one calcium carbonate-comprising material and/or magnesium carbonate-comprising material has a weight median particle size $d_{50}$ value in the range from 0.1 to 7 μm. For example, the at least one calcium carbonate-comprising material has a weight median particle size $d_{50}$ from 0.25 μm to 5 μm and preferably from 0.7 μm to 4 μm.

According to one embodiment of the present invention the at least one calcium carbonate-comprising material and/or magnesium carbonate-comprising material may have a top cut ($d_{98}$) of ≤15 μm. For example, the at least one calcium carbonate-comprising material and/or magnesium carbonate-comprising material may have a top cut ($d_{98}$) of ≤12.5 μm, preferably of ≤10 μm and most preferably of ≤7.5 μm.

According to another embodiment of the present invention the specific surface area of the calcium carbonate-comprising material and/or magnesium carbonate-comprising material from 0.5 to 150 m$^2$/g, preferably from 1 to 60 m²/g and most preferably from 1.5 to 15 m²/g, as measured using nitrogen and the BET method according to ISO 9277:2010.

According to a preferred embodiment of the present invention the calcium carbonate-comprising material and/or magnesium carbonate-comprising material is selected from the group consisting of ground calcium carbonate, preferably marble, limestone, and/or chalk, precipitated calcium carbonate, preferably vaterite, calcite and/or aragonite, dolomite, and mixtures thereof, more preferably the at least one calcium carbonate-comprising material and/or magnesium carbonate-comprising material is selected from the group consisting of dolomitic marble, magnesitic marble, limestone, chalk, and mixtures thereof, and most preferably the at least one calcium carbonate-comprising material and/or magnesium carbonate-comprising material is ground calcium carbonate.

Natural or ground calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising mineral material comprises a wet ground calcium carbonate-comprising mineral material, the grinding step may be performed under conditions such that autogenous grinding takes place and/or by horizontal ball milling, and/or other such processes known to the skilled man. The wet processed ground calcium carbonate-comprising mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural or ground calcium carbonate (GCC) is selected from marble, chalk, limestone, or mixtures thereof. Preferably, the source of ground calcium carbonate is marble, and more preferably dolomitic marble and/or magnesitic marble. According to one embodiment of the present invention the GCC is obtained by dry grinding. According to another embodiment of the present invention the GCC is obtained by wet grinding and subsequent drying.

"Dolomite" in the meaning of the present invention is a calcium carbonate-comprising mineral, namely a carbonic calcium-magnesium-mineral, having the chemical composition of $CaMg(CO_3)_2$ ("$CaCO_3.MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate comprises one type of ground calcium carbonate. According to another embodiment of the present invention, the calcium carbonate comprises a mixture of two or more types of ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation by combining calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

According to one embodiment of the present invention, the calcium carbonate comprises one type of precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to a preferred embodiment of the present invention the at least one calcium carbonate-comprising material and/or magnesium carbonate-comprising material is ground calcium carbonate.

The at least one calcium carbonate-comprising material, preferably the ground calcium carbonate and/or the precipitated calcium carbonate, is preferably in the form of a particulate material. According to one embodiment of the present invention that the at least one calcium carbonate-comprising material, preferably the ground calcium carbonate and/or the precipitated calcium carbonate, has a weight median particle size $d_{50}$ value in the range from 0.1 to 7 µm. For example, the at least one calcium carbonate-comprising material has a weight median particle size $d_{50}$ from 0.25 µm to 5 µm and preferably from 0.7 µm to 4 µm.

According to one embodiment of the present invention the at least one calcium carbonate-comprising material, preferably the ground calcium carbonate and/or the precipitated calcium carbonate, may have a top cut ($d_{98}$) of ≤15 μm. For example, the at least one calcium carbonate-comprising material may have a top cut ($d_{98}$) of <12.5 μm, preferably of <10 μm and most preferably of <7.5 μm.

According to another embodiment of the present invention the specific surface area of the ground calcium carbonate and/or the precipitated calcium carbonate is from 0.5 and 150 m$^2$/g, preferably from 1 to 60 m$^2$/g and most preferably from 1.5 to 15 m$^2$/g as measured using nitrogen and the BET method according to ISO 9277:2010.

According to one embodiment of the present invention the calcium carbonate-comprising material and/or magnesium carbonate-comprising material is additionally treated with another additive. In one preferred embodiment of the present invention, the calcium carbonate-comprising material and/or magnesium carbonate-comprising material is additionally treated with a dispersant, a binder and/or an activating agent and most preferably with a binder and/or an activating agent. Conventional dispersants, binders and activating agents known to the skilled person can be used. A preferred dispersant, for example is a polyacrylate dispersant.

The Surface Treatment Agent

According to the present invention the surface treatment agent is selected from the group consisting of ascorbic acid and/or salts thereof, gallic acid and/or salts thereof, unsaturated fatty acids and/or salts thereof, elemental iron, iron (II)-salts and iron (II)-comprising oxides, iron (II, III)-comprising oxides and mixtures thereof.

According to one embodiment of the present invention the surface-treated calcium carbonate-comprising material and/or magnesium carbonate-comprising material comprises at least one surface treatment agent. The expression "at least one" surface treatment agent means that one or more, for example, two or three surface treatment agents may be present on the surface of the calcium carbonate-comprising material and/or magnesium carbonate-comprising material. According to a preferred embodiment only one surface treatment agent is present on the surface of the calcium carbonate-comprising material and/or magnesium carbonate-comprising material.

According to one embodiment of the present invention the surface treatment agent is ascorbic acid. Ascorbic acid is also known as vitamin C and has the molecular formula $C_6H_8O_6$. For example, the ascorbic acid can be L-ascorbic acid also known as (5R)-5-[(1S)-1,2-dihydroxyethyl]-3,4-dihydroxy-2(5H)-furanone and/or D-isoascorbic acid also known as (5R)-5-[(1R)-1,2-dihydroxyethyl]-3,4-dihydroxyfuran-2(5H)-one. According to a preferred embodiment the ascorbic acid is L-ascorbic acid. In one embodiment, the treatment agent is L-ascorbic acid or D-isoascorbic acid, preferably L-ascorbic acid. In an alternative embodiment, the treatment agent is L-ascorbic acid and D-isoascorbic acid.

Additionally or alternatively, the treatment agent is a salt of ascorbic acid.

The salt of ascorbic acid is preferably a compound selected from the group consisting of sodium, potassium, calcium, palmitate and stearate salts thereof. For example, the treatment agent is a sodium, potassium and/or calcium salt of ascorbic acid.

According to one embodiment of the present invention the surface treatment agent is gallic acid. Gallic acid is also known as 3,4,5-trihydroxybenzoate and has the molecular formula $C_7H_6O_5$.

Additionally or alternatively, the treatment agent is a salt of gallic acid.

The salt of gallic acid is preferably a compound selected from the group consisting of sodium, potassium, calcium, magnesium and lithium salts thereof.

Additionally or alternatively, the at least one surface treatment agent is selected from unsaturated fatty acid.

The term "unsaturated fatty acid" in the meaning of the present invention refers to straight chain or branched chain, unsaturated organic compounds composed of carbon and hydrogen. Said organic compound further contains a carboxyl group placed at the end of the carbon skeleton.

The unsaturated fatty acid is preferably selected from the group consisting of oleic acid, linoleic acid, linolenic acid, crotonic acid, myristoleic acid, palmitoleic acid, sapienic acid, elaidic acid, vaccenic acid, gadoleic acid, erucic acid, nervonic acid, ecosadienoic acid, docosadienoic acid, pinoleic acid, eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, salts of these acids and mixtures thereof, preferably the unsaturated fatty acid is oleic acid or linoleic acid. Most preferably, the surface treatment agent being an unsaturated fatty acid is oleic acid and/or linoleic acid, preferably oleic acid or linoleic acid, most preferably linoleic acid.

Additionally or alternatively, the surface treatment agent is a salt of an unsaturated fatty acid.

The term "salt of unsaturated fatty acid" refers to an unsaturated fatty acid, wherein the active acid group is partially or completely neutralized. The term "partially neutralized" unsaturated fatty acid refers to a degree of neutralization of the active acid groups in the range from 40 and 95 mol-% preferably from 50 to 95 mol-%, more preferably from 60 to 95 mol-% and most preferably from 70 to 95 mol-%. The term "completely neutralized" unsaturated fatty acid refers to a degree of neutralization of the active acid groups of >95 mol-%, preferably of >99 mol-%, more preferably of >99.8 mol-% and most preferably of 100 mol-%. Preferably, the active acid groups are partially or completely neutralized.

The salt of unsaturated fatty acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the surface treatment agent is a salt of oleic acid and/or linoleic acid, preferably oleic acid or linoleic acid, most preferably linoleic acid.

The salt of the unsaturated fatty acid is preferably obtained by treating the unsaturated fatty acid with a base before the surface treatment in order to obtain the corresponding salt thereof.

The base may be selected from potassium hydroxide, lithium hydroxide, ammonium hydroxide and/or sodium hydroxide, and preferably is sodium hydroxide.

The addition of the at least one base to the unsaturated fatty acid can be accomplished by any conventional means known to the skilled person. Preferably, the addition may be carried out under mixing conditions. The skilled person will adapt these mixing conditions such as the mixing speed and temperature according to his process equipment.

The base may be added to the unsaturated fatty acid in an amount ranging of 0.1 to 100 mol-%, preferably in the range of 1 to 98 mol-%, more preferably in the range of 10 to 95 mol-%, and most preferably in the range of 40 to 95 mol-%, based on the unsaturated fatty acid.

According to one embodiment of the present invention the surface treatment agent is elemental iron, iron (II)-salts and iron (II)-comprising oxides and/or, iron (II, III)-comprising oxides.

The term "elemental iron" according to the present invention refers to the chemical element with the symbol Fe. The elemental iron is solid under standard ambient temperature and pressure (SATP) which refers to a temperature of 298.15 K (25° C.) and an absolute pressure of exactly 100 000 Pa (1 bar, 14.5 psi, 0.98692 atm). The elemental iron may be in the form of a powder, tablet, granules, flakes etc.

For example, the elemental iron is a particulate powder iron having a volume median particle size $d_{50}$ ranging from 5 nm to 10 µm. Preferably, the elemental iron is a particulate powder iron having a volume median particle size $d_{50}$ ranging from 10 nm to 2 µm, and more preferably from 30 nm to 500 nm.

In one embodiment, the elemental iron is a particulate powder iron in the nm size range. For example, the elemental iron is a particulate powder iron having a volume median particle size $d_{50}$ ranging from 10 nm to 300 nm, preferably from 20 to 200 nm, and more preferably from 30 nm to 100 nm.

The term "iron (II)-salts" according to the present invention refers to ferrous salts wherein the iron has the oxidation number II. The oxidation number or oxidation state according to the present invention is an indicator of the degree of oxidation (loss of electrons) in the iron in the iron salt. Possible iron (II)-salts are iron bromide ($FeBr_2$), iron chloride ($FeCl_2$), iron fluoride ($FeCl_2$), iron iodide ($FeI_2$), iron molybdate ($FeMoO_4$), iron oxalate ($FeC_2O_4$), iron sulphate ($FeSO_4$) (anhydrous), iron(II) sulphate monohydrate, iron (II) sulphate heptahydrate, ammonium iron(II) sulphate (anhydrous), ammonium iron(II) sulphate hexahydrate, iron tetrafluoroborate ($Fe(BF_4)_2$) and potassium hexacyanoferrate ($K_4Fe(CN)_6$). Preferably, the treatment agent being an iron (II)-salt is selected from the group consisting of iron(II) sulphate monohydrate, iron(II) sulphate heptahydrate, ammonium iron(II) sulphate hexahydrate, iron(II) chloride and mixtures thereof. Most preferably, the treatment agent being an iron (II)-salt is iron(II) sulphate heptahydrate and/or iron(II) chloride, preferably iron(II) sulphate heptahydrate or iron(II) chloride, most preferably iron(II) sulphate heptahydrate.

The term "iron (II)-comprising oxides" according to the present invention refers to ferrous oxides wherein the iron has the oxidation number II. The oxidation number or oxidation state according to the present invention is an indicator of the degree of oxidation (loss of electrons) in the iron in the iron oxide. One possible iron (II)-oxide is FeO.

The term "iron (II, III)-comprising oxides" according to the present invention refers to ferrous oxides wherein the iron has the oxidation number II and III. The oxidation number or oxidation state according to the present invention is an indicator of the degree of oxidation (loss of electrons) in the iron in the iron oxide. One possible iron (II, III)-comprising oxide is $Fe_3O_4$.

According to the present invention the total weight of the surface treatment agent on the total surface area of the at least one calcium carbonate-comprising material and/or magnesium carbonate-comprising material is from 0.01 to 40 mg/m², based on the at least one calcium carbonate-comprising material and/or magnesium carbonate-comprising material.

According to one embodiment of the present invention the total weight of the surface treatment agent on the total surface area of the at least one surface-treated calcium carbonate-comprising material and/or magnesium carbonate-comprising material is from 0.1 to 40 mg/m², preferably from 0.5 to 20 mg/m² and more preferably from 0.7 to 15 mg/m², based on the at least one calcium carbonate-comprising material and/or magnesium carbonate-comprising material.

The "total weight" according to the present invention refers to the weight of the surface treatment agent that is located on the total surface area of the calcium carbonate-comprising material and/or magnesium carbonate-comprising material.

The Surface-Treated Calcium Carbonate-Comprising Material and/or Magnesium Carbonate-Comprising Material The surface-treated calcium carbonate-comprising material and/or magnesium carbonate-comprising material according to the present invention is a calcium carbonate-comprising material and/or magnesium carbonate-comprising material that has been surface treated with a surface treatment agent selected from the group consisting of ascorbic acid and/or salts thereof, gallic acid and/or salts thereof, unsaturated fatty acids and/or salts thereof, elemental iron, iron (II)-salts and iron (ID-comprising oxides, iron (II, III)-comprising oxides and mixtures thereof. The total weight of the surface treatment agent on the total surface area of the at least one calcium carbonate-comprising material and/or magnesium carbonate-comprising material is from 0.01 to 40 mg/m², based on the at least one calcium carbonate-comprising material and/or magnesium carbonate-comprising material.

According to one embodiment the surface-treated calcium carbonate-comprising material and/or magnesium carbonate-comprising material according to the present invention is in the form of a suspension.

According to a preferred embodiment the surface-treated calcium carbonate-comprising material and/or magnesium carbonate-comprising material according to the present invention is in the form of a solid, for example, in the form of a powder, tablet, granules, flakes etc. Preferably the surface-treated calcium carbonate-comprising material and/or magnesium carbonate-comprising material according to the present invention is in the form of a powder.

The surface-treated calcium carbonate-comprising material and/or magnesium carbonate-comprising material according to the present invention, is preferably in the form of a particulate material. According to one embodiment of the present invention the surface-treated calcium carbonate-comprising material and/or magnesium carbonate-comprising material according to the present invention has a weight median particle size $d_{50}$ value in the range from 0.1 to 7 µm. For example, the surface-treated calcium carbonate-comprising material and/or magnesium carbonate-comprising material has a weight median particle size $d_{50}$ from 0.25 µm to 5 µm and preferably from 0.7 µm to 4 µm.

According to one embodiment of the present invention the surface-treated calcium carbonate-comprising material and/or magnesium carbonate-comprising material according to the present invention may have a top cut ($d_{98}$) of <15 µm. For example, the surface-treated calcium carbonate-comprising material and/or magnesium carbonate-comprising material according to the present invention may have a top cut ($d_{98}$) of ≤12.5 µm, preferably of ≤10 µm and most preferably of ≤7.5 µm.

According to another embodiment of the present invention the specific surface area of the surface-treated calcium carbonate-comprising material and/or magnesium carbonate-comprising material according to the present invention is from 0.5 and 150 m$^2$/g, preferably from 1 to 60 m$^2$/g and most preferably from 1.5 to 15 m$^2$/g as measured using nitrogen and the BET method according to ISO 9277:2010.

According to another embodiment of the present invention the total weight of the surface treatment agent on the total surface area of the at least one surface-treated calcium carbonate-comprising material and/or magnesium carbonate-comprising material is from 0.1 to 40 mg/m$^2$, preferably from 0.5 to 20 mg/m$^2$ and more preferably from 0.7 to 15 mg/m$^2$, based on the at least one calcium carbonate-comprising material and/or magnesium carbonate-comprising material.

Furthermore, the treated calcium carbonate-comprising material of the inventions preferably has a specific moisture pick up susceptibility. It is preferred that the moisture pick up susceptibility of the treated calcium carbonate is such that its total surface moisture level is ≤100 mg/g, more preferably ≤60 mg/g and most preferably below ≤40 mg/g of the dry treated calcium carbonate. For example, the treated calcium carbonate has a moisture pick up susceptibility in the range from 0.05 to 20 mg/g, preferably from 0.1 to 15 mg/g and more preferably from 0.2 to 10 mg/g.

According to one embodiment of the present invention, the surface-treated calcium carbonate-comprising material and/or magnesium carbonate-comprising material further comprises at least one supplemental agent which is a hydrophobising agent.

The at least one hydrophobising agent may be any agent known to the skilled person which is capable to form a hydrophobic treatment layer on at least a part of the accessible surface area of the surface-treated calcium carbonate-comprising material and/or magnesium carbonate-comprising material.

The term "at least one" hydrophobising agent in the meaning of the present invention means that the hydrophobising agent comprises, preferably consists of, one or more hydrophobising agents.

In one embodiment of the present invention, the at least one supplemental agent which is a hydrophobising agent comprises, preferably consists of, one hydrophobising agent. Alternatively, the at least one hydrophobising agent comprises, preferably consists of, two or more hydrophobising agents. For example, the at least one hydrophobising agent comprises, preferably consists of, two or three hydrophobising agents.

Preferably, the at least one hydrophobising agent comprises, more preferably consists of, one hydrophobising agent.

According to one embodiment of the present invention the surface-treated calcium carbonate-comprising material and/or magnesium carbonate-comprising material comprises at least one supplemental agent which is a hydrophobising agent selected from the group consisting of an aliphatic carboxylic acid having a total amount of carbon atoms from C$_4$ to C$_{24}$ and/or reaction products thereof, a mono-substituted succinic anhydride consisting of succinic anhydride mono-substituted with a group selected from a linear, branched, aliphatic and cyclic group having a total amount of carbon atoms from at least C$_2$ to C$_{30}$ in the substituent and/or reaction products thereof, a phosphoric acid ester blend of one or more phosphoric acid mono-ester and/or reaction products thereof and one or more phosphoric acid di-ester and/or reaction products thereof, polyhydrogensiloxane and reaction products thereof, an inert silicone oil, preferably polydimethylsiloxane, and mixtures thereof.

Suitable aliphatic carboxylic acids for treating the surface-reacted calcium carbonate obtained in step c) are for example aliphatic linear or branched carboxylic acids having between 4 and 24 carbon atoms.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, tricosanoic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

Additionally or alternatively, the at least one supplemental agent which is a hydrophobising agent is a mono-substituted succinic anhydride consisting of succinic anhydride mono-substituted with a group selected from a linear, branched, aliphatic and cyclic group having a total amount of carbon atoms from at least C$_2$ to C$_{30}$ in the substituent and/or a phosphoric acid ester blend of one or more phosphoric acid mono-ester and one or more phosphoric acid di-ester.

Mono-substituted succinic anhydrides and/or phosphoric acid ester blends and suitable compounds for coating are described in EP 2 722 368 A1 and EP 2 770 017 A1, which are thus incorporated herewith by references.

Additionally or alternatively, the at least one hydrophobising agent is an inert silicone oil such as a polydialkylsiloxane, as e.g. described in US 2004/0097616 A1.

Most preferred inert silicone oils are selected from the group consisting of polydimethylsiloxane, preferably dimethicone, polydiethylsiloxane and polymethylphenylsiloxane and/or mixtures thereof.

The inert silicone oil is preferably present in a quantity such that the total amount of said inert silicone oil on at least a part of the surface of the surface-treated calcium carbonate-comprising material and/or magnesium carbonate-comprising material is less than 1 000 ppm, more preferably less than 800 ppm and most preferably less than 600 ppm. For example, the total amount of the inert silicone oil on at least a part of the surface of the surface-treated calcium carbonate-comprising material and/or magnesium carbonate-comprising material is from 100 to 1 000 ppm, more preferably from 200 to 800 ppm and most preferably from 300 to 600 ppm, e.g. from 400 to 600 ppm.

Additionally or alternatively, the at least one hydrophobising agent is a polyhydrogensiloxane, preferably a poly(methylhydrosiloxane).

Additionally or alternatively, the at least one hydrophobising agent is an aliphatic fatty aldehyde. Aliphatic fatty aldehydes for coating are described in EP 2 390 285 A1.

It is preferred that the total weight of the at least one hydrophobising agent on the total surface area of the surface-treated calcium carbonate-comprising material and/or magnesium carbonate-comprising material is below the total weight of the treatment agent which is located as a treatment layer on at least a part of the surface of the calcium carbonate-comprising material and/or magnesium carbonate-comprising material.

According to one embodiment of the present invention the surface-treated calcium carbonate-comprising material and/or magnesium carbonate-comprising material further comprises at least one hydrophobising agent, which at least partially covers the surface-treated calcium carbonate-comprising material and/or magnesium carbonate-comprising material, wherein the total weight of the at least one hydrophobising agent on the total surface area of the surface-treated calcium carbonate-comprising material and/or magnesium carbonate-comprising material is from 0.001 to 10 mg/m$^2$, preferably from 0.001 to 9 mg/m$^2$, more preferably from 0.01 to 8 mg/m$^2$, and most preferably from 0.1 to 4 mg/m$^2$, based on the at least one calcium carbonate-comprising material and/or magnesium carbonate-comprising material.

Method for the Preparation of the Surface-Treated Calcium Carbonate-Comprising Material and/or Magnesium Carbonate-Comprising Material The surface-treated calcium carbonate-comprising material and/or magnesium carbonate-comprising material according to the present invention is a calcium carbonate-comprising material and/or magnesium carbonate-comprising material that has been surface treated with a surface treatment agent selected from the group consisting of ascorbic acid and/or salts thereof, gallic acid and/or salts thereof, unsaturated fatty acids and/or salts thereof, elemental iron, iron (II)-salts and iron (II)-comprising oxides, iron (II, III)-comprising oxides and mixtures thereof. The total weight of the surface treatment agent on the total surface area of the at least one calcium carbonate-comprising material and/or magnesium carbonate-comprising material is from 0.01 to 40 mg/m$^2$, based on the at least one calcium carbonate-comprising material and/or magnesium carbonate-comprising material.

Methods for preparing the surface-treated calcium carbonate-comprising material and/or magnesium carbonate-comprising material according to the present invention are known to the skilled person. For example, one method for the treatment of a calcium carbonate-comprising material and/or magnesium carbonate-comprising material comprises the steps of:

a) providing a calcium carbonate-comprising material and/or magnesium carbonate-comprising material,
b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and
c) combining the calcium carbonate-comprising material and/or magnesium carbonate-comprising material of step a) with the treatment agent of step b) in one or more steps at a temperature of from 20 to 120° C. under mixing, such that the total weight of the treatment agent added is from 0.01 to 40 mg/m$^2$, based on the at least one calcium carbonate-comprising material and/or magnesium carbonate-comprising material.

Characterization of Step A): Provision of a Calcium Carbonate-Comprising Material and/or Magnesium Carbonate-Comprising Material.

According to step a) a calcium carbonate-comprising material and/or magnesium carbonate-comprising material is provided as defined above.

It is appreciated that the calcium carbonate-comprising material and/or magnesium carbonate-comprising material can be provided in form of an aqueous suspension or in dry form.

If the calcium carbonate-comprising material and/or magnesium carbonate-comprising material is provided in form of an aqueous suspension, the aqueous suspension preferably has a solids content in the range from 5 to 80 wt.-%, based on the total weight of the aqueous suspension. According to a preferred embodiment the solids content of the aqueous suspension is in the range from 10 to 78 wt.-%, more preferably in the range from 15 to 75 wt.-% and most preferably in the range from 15 to 75 wt.-%, based on the total weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-%, preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

According to a preferred embodiment the aqueous suspension consists of water and the calcium carbonate-comprising material and/or magnesium carbonate-comprising material.

Alternatively, the aqueous surface-reacted calcium carbonate suspension comprises further additives.

Additionally or alternatively, the aqueous calcium carbonate-comprising material and/or magnesium carbonate-comprising material suspension comprises a dispersing agent, e.g. a polyacrylate.

Preferably, the calcium carbonate-comprising material and/or magnesium carbonate-comprising material provided in step a) is a dry calcium carbonate-comprising material and/or magnesium carbonate-comprising material.

For example, the calcium carbonate-comprising material and/or magnesium carbonate-comprising material provided in step a) has a moisture content of less than 10.0 wt.-% based on the dry weight of the calcium carbonate-comprising material and/or magnesium carbonate-comprising material provided in step a).

In one embodiment, the calcium carbonate-comprising material and/or magnesium carbonate-comprising material provided in step a) has a moisture content of from 0.01 wt.-% to 10.0 wt.-%, preferably from 0.01 wt.-% to 8.0 wt.-% and more preferably from 0.01 wt.-% to 6.0 wt.-% based on the dry weight of the calcium carbonate-comprising material and/or magnesium carbonate-comprising material provided in step a).

Characterization of Step B): Provision of a Treatment Agent

According to step b) a treatment agent is provided as defined above.

The treatment agent is preferably in "liquid" or "molten" form. For example, the treatment agent is a (neat) liquid at 25° C. and ambient pressure. Alternatively, the treatment agent is in molten form.

If the treatment agent is in solid form it can also be dissolved/dispersed/suspended in a solvent and added as solution or suspension or dispersion to the calcium carbonate-comprising material and/or magnesium carbonate-comprising material in step c), i.e. as a liquid.

The solvent that may be used to dilute/dissolve/disperse/suspend the treatment agent may be water and/or an organic solvent that is miscible with water, for example, an organic solvent like methanol, ethanol, n-butanol, isopropanol, n-propanol, and mixtures thereof. According to a preferred embodiment the solvent consists of water. According to another preferred embodiment the solvent is a mixture of water and at least one organic solvent that is miscible with water. Preferably, the solvent is a mixture consisting of water and ethanol and more preferably the water:ethanol mixture has a ratio from 2:1 to 1:2, based on the weight of the solvents and most preferably the water:ethanol mixture has a ratio of 1:1, based on the weight of the solvents.

According to one embodiment the solids content of the diluted/dispersed suspension/dispersion comprising the solvent and the treatment agent is in the range from 0.1 to 60 wt.-%, preferably in the range from 1 to 40 wt.-%, more preferably in the range from 1.5 to 30 wt.-%, and most preferably in the range from 2 to 25 wt.-%, based on the total weight of the suspension/dispersion.

According to another embodiment the amount of the treatment agent in the diluted/dissolved/dispersed/suspended solution/suspension/dispersion comprising the solvent and the treatment agent is in the range from 0.1 to 60 wt.-%, preferably in the range from 1 to 40 wt.-%, more preferably in the range from 1.5 to 30 wt.-%, and most preferably in the range from 2 to 25 wt.-%, based on the total weight of the solution/suspension/dispersion.

According to another embodiment the treatment agent or the diluted/dissolved/dispersed solution/suspension/dispersion comprising the solvent and the at least one treatment agent is preheated, before combining step c) is carried out. That is to say, the treatment agent or the diluted/dissolved/dispersed solution/suspension/dispersion comprising the solvent and the treatment agent is treated at a temperature of from 30 to 120° C., preferably of from 45 to 115° C., more preferably of from 50 to 105° C. and most preferably of from 80 to 100° C. before combining step c) is carried out.

The treatment time for carrying out the preheating of the treatment agent or the diluted/dissolved/dispersed solution/suspension/dispersion comprising the solvent and the treatment agent is carried out for a period of 30 min or less, preferably for a period of 20 min or less and more preferably for a period of 15 min or less.

According to another embodiment the treatment agent or the diluted/dissolved/dispersed solution/suspension/dispersion comprising the solvent and the treatment agent is preheated at a temperature of from 30 to 120° C., preferably of from 45 to 115° C., more preferably of from 50 to 105° C. and most preferably of from 80 to 100° C. before addition step c) is carried out for a period of 30 min or less, preferably for a period of 20 min or less and more preferably for a period of 15 min or less.

In one embodiment the preheating of the treatment agent or the diluted/dissolved/dispersed solution/suspension/dispersion comprising the solvent and the treatment agent is carried out at a temperature that is of about equal to the temperature implemented during combining step c).

The term "equal" temperature in the meaning of the present invention refers to a preheating temperature that is at most 20° C., preferably at most 15° C., more preferably 10° C. and most preferably at most 5° C., below or above the temperature implemented during combining step c).

The preheating of the treatment agent or the diluted/dissolved/dispersed solution/suspension/dispersion comprising the solvent and the treatment agent preferably takes place under mixing conditions. The skilled man will adapt these mixing conditions (such as the configuration of mixing pallets and mixing speed) according to his process equipment.

Alternatively the surface-treatment agent can be added as solid. For example, if the surface-treatment agent is elemental iron, it may be added as sold, for example, as powder.

Characterization of Step C): Combining the Calcium Carbonate-Comprising Material and/or Magnesium Carbonate-Comprising Material with the Treatment Agent According to step c) the calcium carbonate-comprising material and/or magnesium carbonate-comprising material of step a) is combined with the treatment agent of step b) in one or more steps at a temperature of from 1 to 200° C. under mixing, such that the total weight of the surface treatment agent added is from 0.01 to 40 mg/m$^2$, based on the calcium carbonate-comprising material and/or magnesium carbonate-comprising material of step a).

It is required that the treatment agent is added to the calcium carbonate-comprising material and/or magnesium carbonate-comprising material of step a) such that the total weight of the treatment agent added is from 0.01 to 40 mg/m$^2$, based on the calcium carbonate-comprising material and/or magnesium carbonate-comprising material of step a).

For example, the treatment agent is added to the calcium carbonate-comprising material and/or magnesium carbonate-comprising material of step a) such that the total weight of the treatment agent added in step c) is from 0.1 to 40 mg/m$^2$ and preferably from 0.5 to 20 mg/m$^2$, based on the calcium carbonate-comprising material and/or magnesium carbonate-comprising material of step a). Most preferably, the treatment agent is added to the calcium carbonate-comprising material and/or magnesium carbonate-comprising material of step a) such that the total weight of the treatment agent added in step c) is from 0.7 to 15 mg/m$^2$, based on the calcium carbonate-comprising material and/or magnesium carbonate-comprising material of step a).

Additionally or alternatively, the treatment agent of step b) is added in step c) in an amount of from 0.01 to 80.0 wt.-%, based on the total dry weight of the calcium carbonate-comprising material and/or magnesium carbonate-comprising material of step a). Preferably, the treatment agent of step b) is added in step c) in an amount of from 0.01 to 40.0 wt.-%, more preferably from 0.1 to 20.0 wt.-% and most preferably from 0.5 to 10.0 wt.-%, based on the total dry weight of calcium carbonate-comprising material and/or magnesium carbonate-comprising material of step a).

The step of combining the calcium carbonate-comprising material and/or magnesium carbonate-comprising material of step a) with the treatment agent of step b), in one or more steps, preferably takes place under mixing conditions. The skilled man will adapt these mixing conditions (such as the configuration of mixing pallets and mixing speed) according to his process equipment.

For example, the mixing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany or from MTI Mischtechnik International GmbH, Germany.

In one embodiment the method is carried out in a continuous mode. In this case, it is possible to add the treatment agent to the calcium carbonate-comprising material and/or magnesium carbonate-comprising material of step a) in a constant flow such that a constant concentration of the treatment agent is provided during step c).

Alternatively, the treatment agent is added to the calcium carbonate-comprising material and/or magnesium carbonate-comprising material of step a) in one step, wherein said treatment agent is preferably added in one portion.

In another embodiment the method can be carried out in a batch mode, i.e. the treatment agent is added to the calcium carbonate-comprising material and/or magnesium carbonate-comprising material of step a) in more than one step, wherein said treatment agent is preferably added in about equal portions. Alternatively, it is also possible to add the treatment agent in unequal portions to the aqueous calcium carbonate-comprising material and/or magnesium carbonate-comprising material of step a), i.e. in larger and smaller portions.

According to one embodiment of the present invention, step c) is carried out in a batch or continuous process for a period of time from 0.1 to 1 000 s. For example, step c) is a continuous process and comprises one or several contacting steps and the total contacting time is from 0.1 to 20 s, preferably from 0.5 to 15 s and most preferably from 1 to 10 s.

In order to obtain a sufficient combining of the calcium carbonate-comprising material and/or magnesium carbonate-comprising material of step a) with the treatment agent of step b), it is required that combining step c) is carried out at a temperature of from 10 to 200° C. For example, combining step c) is carried out at a temperature of from 20 to 150° C., more preferably from 20 to 120° C., even more preferably from 20 to 100° C. and most preferably from 20 to 80° C. It is appreciated that the temperature at which combining step c) is carried out is preferably adapted to the specific treatment agent used. According to one embodiment the treatment agent of step b) can be in liquid form, i.e. a neat liquid or a diluted/dissolved/dispersed solution/suspension/dispersion, or in molten form.

If the treatment agent of step b) is in form of a neat liquid or a diluted/dissolved solution at 25° C. and ambient pressure, combining step c) is thus preferably carried out at a temperature of from 10 to 40° C., preferably of from 20 to 40° C., more preferably of from 25 to 35° C., and most preferably of about 30° C. (±2° C.).

Alternatively combining step c) can be carried out at a temperature of from 40 to 200° C., preferably of from 50 to 150° C., more preferably of from 60 to 120° C. and most preferably of from 80 to 120° C.

According to one embodiment, the calcium carbonate-comprising material and/or magnesium carbonate-comprising material provided in step a) and/or the treatment agent of step b) is/are preheated, before step c) is carried out. For example, the calcium carbonate-comprising material and/or magnesium carbonate-comprising material provided in step a) or the treatment agent of step b) is preheated, before step c) is carried out. Preferably, the calcium carbonate-comprising material and/or magnesium carbonate-comprising material provided in step a) is preheated, before step c) is carried out.

For example, the calcium carbonate-comprising material and/or magnesium carbonate-comprising material provided in step a) is preheated, before step c) is carried out. That is to say, the calcium carbonate-comprising material and/or magnesium carbonate-comprising material of step a) is preheated at a temperature of from 30 to 120° C.

The treatment time for carrying out the preheating of the calcium carbonate-comprising material and/or magnesium carbonate-comprising material of step a) is carried out for a period of 30 min or less, preferably for a period of 20 min or less and most preferably for a period of 15 min or less, e.g. 5 min to 15 min.

In one embodiment of the present invention, the preheating of the calcium carbonate-comprising material and/or magnesium carbonate-comprising material of step a) is carried out at a temperature that is about equal to the temperature implemented during combining step c).

The term "equal" temperature in the meaning of the present invention refers to a preheating temperature that is at most 20° C., preferably at most 15° C., more preferably 10° C. and most preferably at most 5° C., below or above the temperature implemented during combining step c).

The preheating of the calcium carbonate-comprising material and/or magnesium carbonate-comprising material of step a) preferably takes place under mixing conditions. The skilled man will adapt these mixing conditions (such as the configuration of mixing pallets and mixing speed) according to his process equipment.

In one embodiment, combining step c) is carried out for at least 1 min, preferably for at least 5 min, e.g. for at least 10 min, 15 min, 20 min, 30 min or 45 min. Additionally or alternatively, combining step c) is carried out for at most 60 min, preferably for at most 45 min, e.g. for at most 30 min.

For example, combining step c) is carried out for a period of time ranging from 1 min to 60 min, preferably for a period of time ranging from 10 min to 45 min, and most preferably from 10 min to 30 min. For example, the combining step c) is carried out for 20 min±5 minutes.

It is appreciated that combining step c) is preferably carried out at a temperature in the range from 20 to 120° C. and for a period of time ranging from 1 min to 60 min.

In one embodiment, the surface-treated calcium carbonate-comprising material and/or magnesium carbonate-comprising obtained in step c) is dried. This optional step is preferably carried out in order to reduce the moisture content of the surface-treated calcium carbonate-comprising material and/or magnesium carbonate-comprising material. Thus, the dried surface-treated calcium carbonate-comprising material and/or magnesium carbonate-comprising material has a moisture content that is below the moisture content of the surface-treated calcium carbonate-comprising material and/or magnesium carbonate-comprising material before the drying step.

According to one embodiment, the method thus comprises a further step of drying the surface-treated calcium carbonate-comprising material and/or magnesium carbonate-comprising material.

For example, optional drying step is carried out at a temperature in the range from 40 to 200° C., preferably from 50 to 150° C., more preferably from 60 to 120° C. and most preferably from 80 to 120° C., at ambient or reduced pressure until the moisture content of the obtained surface-treated calcium carbonate-comprising material and/or magnesium carbonate-comprising material is in the range from 0.001 to 20 wt.-%, based on the total weight of the surface-treated calcium carbonate-comprising material and/or magnesium carbonate-comprising material.

It is appreciated that optional drying step can be carried out at ambient pressure or at reduced pressure. Preferably, the drying is carried out at ambient pressure.

Thus, the optional drying step is preferably carried out at a temperature in the range from 40 to 200° C. at ambient pressure. For example, the optional drying step is carried out at a temperature in the range from 50 to 150° C., preferably from 60 to 120° C. and more preferably from 80 to 120° C. at ambient pressure.

In one embodiment, the optional drying step is carried out until the moisture content of the obtained surface-treated calcium carbonate-comprising material and/or magnesium carbonate-comprising material is in the range from 0.005 to 15 wt.-%, preferably in the range from 0.01 to 10 wt.-% and more preferably from 0.05 to 5 wt.-%, based on the total weight of the surface-treated calcium carbonate-comprising material and/or magnesium carbonate-comprising material.

Further Reaction Steps

The methods for preparing the surface-treated calcium carbonate-comprising material and/or magnesium carbonate-comprising material according to the present invention may comprise a further step d) of treating the surface-treated calcium carbonate-comprising material and/or magnesium carbonate-comprising material obtained in step c) with at least one supplemental agent which is a hydrophobising agent as defined above. If the method comprises step d), it is appreciated that step d) is carried out after combining step c).

Use of the Surface-Treated Calcium Carbonate-Comprising Material and/or Magnesium Carbonate-Comprising Material The surface-treated calcium carbonate-comprising material and/or magnesium carbonate-comprising material according to the present invention can be used as oxygen scavenger.

With regard to the definition of the surface-treated calcium carbonate-comprising material and/or magnesium carbonate-comprising material and preferred embodiments thereof, reference is made to the statements provided above.

The inventors surprisingly found that the surface-treated calcium carbonate-comprising material and/or magnesium carbonate-comprising material provides a highly efficient oxygen ($O_2$) scavenging, and especially an improved oxygen ($O_2$) scavenging in comparison to already known oxygen scavenger materials. Furthermore, the surface-treated calcium carbonate-comprising material and/or magnesium carbonate-comprising material according to the present invention provides a long lasting oxygen ($O_2$) scavenging effect and/or is capable of removing a high amount of oxygen from the surrounding per unit addition of the scavenger.

According to one embodiment of the present invention the total volume of oxygen reacted per gram of surface treatment agent is in the range from 0.01 to 50 mL per gram of surface treatment agent per day and preferably in the range from 0.1 to 25 mL per gram of surface treatment agent per day and more preferably in the range from 0.4 to 10 mL per gram of surface treatment agent per day, wherein the reaction with oxygen is carried out with 500 g dried surface-treated calcium carbonate-comprising material and/or magnesium carbonate-comprising material in a closed desiccator with a volume of 7 L filled with air under normal pressure.

Furthermore, the surface-treated calcium carbonate-comprising material and/or magnesium carbonate-comprising material according to the present invention is non-toxic, can be easily handled and can be used in a great variety of applications.

In view of the oxygen scavenging properties of the treated surface-reacted calcium carbonate, the treated surface-reacted calcium carbonate can be used in a great variety of applications. For example, the treated surface-reacted calcium carbonate can be used in polymer compositions, coatings, preferably polymer or paper coatings, more preferably paper coatings, food applications, filter and/or cosmetic applications, preferably in food applications and more preferably in food packaging applications.

The scope and interest of the present invention will be better understood based on the following examples which are intended to illustrate certain embodiments of the present invention and are non-limitative.

EXAMPLES

1 Measurement Methods

In the following, measurement methods implemented in the examples are described.

Moisture Pick Up Susceptibility

The moisture pick up susceptibility of a material as referred to herein is determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample.

The moisture pick up susceptibility in mg/g divided by the specific surface area in $m^2/g$ (calculated based on the specific surface area BET) corresponds to the "normalized moisture pick up susceptibility" expressed in $mg/m^2$ of sample.

Solids Content

The suspension solids content (also known as "dry weight") was determined using a Moisture Analyser MJ33 (Mettler-Toledo, Switzerland), with the following settings: drying temperature of 150° C., automatic switch off if the mass does not change more than 1 mg over a period of 30 sec, standard drying of 5 to 20 g of suspension.

Particle Size Distribution (Mass % Particles with a Diameter<X) and Weight Median Diameter ($d_{50}$) of a Particulate Material Weight median grain diameter and grain diameter mass distribution of a particulate material were determined via the sedimentation process, i.e. an analysis of sedimentation behaviour in a gravitational field. The measurement was made with a Sedigraph™ 5100 or Sedigraph™ 5120.

Volume median grain diameter $d_{50}$ and grain diameter volume distribution of a particulate material such as particulate powder iron was evaluated using a Malvern Mastersizer 2000 Laser Diffraction System (Malvern Instruments Plc., Great Britain) using the Mie theory, with a particle refractive index of 1.57 and an absorption index of 0.005. Alternatively, the measurement can be made with a HELOS particle-size-analyser of Sympatec, Germany. The measurement may be considered equivalent to weight distribution assuming a constant density throughout the particle size distribution, and reference is made to the measurement technique.

The method and instrument are known to the skilled person are commonly used to determine particle sizes of fillers and other particulate materials. The measurement was carried out in an aqueous solution comprising 0.1 wt.-% $Na_4P_2O_7$. The samples were dispersed using a high speed stirrer and in the presence of supersonics.

BET Specific Surface Area of a Material

Throughout the present document, the specific surface area (in $m^2/g$) of the mineral filler is determined using the BET method (using nitrogen as adsorbing gas), which is well known to the skilled man (ISO 9277:2010). The total surface area (in $m^2$) of the mineral filler is then obtained by multiplication of the specific surface area and the mass (in g) of the mineral filler prior to treatment.

Humidity of Calcium Carbonate

A 10 g powder sample has been heated in an oven at 150° C. until the mass is constant for 20 minutes. The mass loss has been determined gravimetrically and is expressed as wt.-% loss based on the initial sample mass. This mass loss has been attributed to the sample humidity.

Oxygen Scavenging Tests

Oxygen-scavenging tests were performed by placing a defined amount of powder in a closed desiccator equipped with an oxygen measuring device (GOX 100, GHM Messtechnik GmbH) and the total amount of oxygen scavenged by gram of sample (or active substance) estimated, assuming the gas respect the ideal gas law, and neglecting the volume occupied by the powders. Results were expressed as mL $O_2$/g of powder, or mL $O_2$/g of active substance.

The following equations were used for the calculations:

$$n(gas) = \frac{PV}{R \cdot T}$$

$$n(O_2) = n(gas) \times 20.9/100$$

$$m(O_2) = n(O_2) \times M(O_2)$$

$$V(O_{2desiccator}) = V(desiccator) \times 20.9/100$$

Assuming R=8.314 $J \cdot K^{-1} \cdot mol^{-1}$
T=295 K
P=101 300 Pa
$M(O_2)$=32 $g \cdot mol^{-1}$
$O_2$ in air=20.9%

The values presented in the experimental section are calculated as follow:

$$O_2 \text{ scavenged(mL/g of powder)} = \frac{20.9 - (\% O_2 \text{measured})}{20.9} \times \frac{V_{O2desiccator}}{m(\text{powder})}$$

$$O_2 \text{ scavenged(mL/g of surface treatment agent)} =$$

$$\left( O_2 \text{ scavenged(mL/g of powder)} \times \frac{m(\text{surface treatment agent})}{m(\text{powder after treatment})} \right)$$

2 Preparation of the Surface Treated Calcium Carbonate-Comprising Material and/or Magnesium Carbonate-Comprising Material In the following description of the preparation of the Examples and Comparatives Examples the indication of weight in form of "parts" always refers to "parts by weight", unless indicated otherwise.

2.1 Surface Treatments with Unsaturated Fatty Acids 2.1.1 Example 1

Powder 1

1.00 kg of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 30° C.). After that time, 0.6 parts relative to 100 parts $CaCO_3$ of linoleic acid (6 g, Sigma-Aldrich (Germany), technical grade 60-74%) was introduced and stirring was continued for another 20 minutes (30° C., 3 000 rpm). This treatment level corresponds to approx. 2.3 $mg/m^2$. After that time, the mixture was taken out. A hydrophobic white powder was obtained (Powder 1).

2.1.2 Example 2

Powder 2

1.00 kg of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 30° C.). After that time, 1.0 parts relative to 100 parts $CaCO_3$ of linoleic acid (10 g, Sigma-Aldrich (Germany), technical grade 60-74%) was introduced and stirring was continued for another 20 minutes (30° C., 3 000 rpm). This treatment level corresponds to approx. 3.8 $mg/m^2$. After that time, the mixture was taken out. A hydrophobic white powder was obtained (Powder 2).

2.1.3 Example 3

Powder 3

1.00 kg of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 30° C.). After that time, 3 parts relative to 100 parts $CaCO_3$ of linoleic acid (30 g, Sigma-Aldrich (Germany), technical grade 60-74%) was introduced and stirring was continued for another 20 minutes (30° C., 3 000 rpm). This treatment level corresponds to approx. 11.5 $mg/m^2$. After that time, the mixture was taken out. A hydrophobic white powder was obtained (Powder 3).

2.1.4 Example 4

Powder 4

1.00 kg of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 30° C.). After that time, 0.6 parts relative to 100 parts $CaCO_3$ of oleic acid (6 g, Fluka (Belgium)) was introduced and stirring was continued for another 20 minutes (30° C., 3 000 rpm). This treatment level corresponds to approx. 2.3 $mg/m^2$. After that time, the mixture was taken out. A hydrophobic white powder was obtained (Powder 4).

2.1.5 Example 5

Powder 5

1.00 kg of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 30° C.). After that time, 1.0 parts relative to 100 parts $CaCO_3$ of oleic acid (10 g, Alfa Aesar (Germany), technical grade, 90%) was introduced and stirring was continued for another 20 minutes (30° C., 3 000 rpm). This treatment level corresponds to approx. 3.8 $mg/m^2$. After that time, the mixture was taken out. A hydrophobic white powder was obtained (Powder 5).

2.1.6 Example 6

Powder 6

1.00 kg of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 30° C.). After that time, 3 parts relative to 100 parts $CaCO_3$ of oleic acid (30 g, Fluka (Belgium)) was introduced and stirring was continued for another 20 minutes (30° C., 3 000 rpm). This treatment level corresponds to approx. 11.5 $mg/m^2$. After that time, the mixture was taken out. A hydrophobic white powder was obtained (Powder 6).

2.1.7 Example 7

Powder 7

1.00 kg of dry ground calcium carbonate from Italy ($d_{50}$=1.7 μm, BET specific surface area=3.8 $m^2/g$) was placed in a high speed mixer (MTI Mixer, MTI Mischtechnik International GmbH, Germany), and conditioned by stirring for 10 minutes (3 000 rpm, 30° C.). After that time, 1.0 parts relative to 100 parts $CaCO_3$ of oleic acid (10 g, Fluka (Belgium)) was introduced and stirring was continued for another 20 minutes (30° C., 3 000 rpm). This treatment level corresponds to approx. 2.6 $mg/m^2$. After that time, the mixture was taken out. A hydrophobic white powder was obtained (Powder 7).

2.2 Surface Treatments with Ascorbic Acid

2.2.1 Example 8

Powder 8

700 g of dry ground calcium carbonate from Italy ($d_{50}$=1.7 μm, BET specific surface area=3.8 $m^2/g$) placed in a high speed mixer (MTI Mixer, MTI Mischtechnik International GmbH, Germany), and conditioned by stirring for 10 minutes (3 000 rpm, 30° C.). After that time, 1.0 parts relative to 100 parts $CaCO_3$ of (L)-ascorbic acid (reagent grade, Sigma life science, China, 31 g of a previously prepared 22.6% solid content aqueous solution) was added and stirring was continued for another 20 minutes (100° C., 3 000 rpm). This treatment level corresponds to approx. 2.6 $mg/m^2$. After that time, the mixture was cooled down and taken out of the mixer. A coloured (beige-yellow) powder was obtained (Powder 8).

2.2.2 Example 9

Slurry 9

To 600 g (100 parts) of wet ground and spray dried marble from Carrara, Italy ($d_{50}$=1.6 μm, BET specific surface area=4.1 $m^2/g$) in a 2 L bottle was added 440 g water and 0.46 parts of a polyacrylate dispersant (2.76 g of a 42 wt.-% aqueous solution of a 100% sodium-neutralised polyacrylate, $M_w$=3 500 g/mol, pH=8) is added dropwise under strong stirring (930 rpm) at room temperature (Pendraulik stirrer). Once a stable suspension was obtained, 1.0 part ascorbic acid (6 g, reagent grade, Sigma life science) was added at room temperature (this treatment level corresponds to approx. 2.4 $mg/m^2$), and stirring was continued for 10 minutes. The mixture became thicker (Slurry 9).

2.3 Surface Treatments with Gallic Acid

2.3.1 Example 10

Powder 10

700 g of dry ground calcium carbonate from Italy ($d_{50}$=2.6 μm, BET specific surface area=2.6 $m^2/g$) was placed in a high speed mixer (MTI Mixer, MTI Mischtechnik International GmbH, Germany), and conditioned by stirring for 10 minutes (3 000 rpm, 80° C.). After that time, 1.0 parts relative to 100 parts $CaCO_3$ of gallic acid (Sigma-Aldrich, 35 g of a previously prepared 20% solid content solution in ethanol) was added and stirring was continued for another 10 minutes at 80° C., then for 10 minutes at 100° C. and again 20 minutes at 80° C. (3 000 rpm). This treatment level corresponds to approx. 3.8 $mg/m^2$. After that time, the mixture was cooled down and taken out of the mixer. A coloured (grey-green) powder was obtained (Powder 10).

2.4 Surface Treatments with Iron

2.4.1 Example 11

Slurry 11

To 600 g (100 parts) of wet ground and spray dried marble from Carrara, Italy ($d_{50}$=1.6 μm, BET specific surface area=4.1 $m^2/g$) in a 2 L bottle was added 300 g water and 0.23 parts of a polyacrylate dispersant (1.38 g of a 42 wt.-% aqueous solution of a 100% sodium-neutralised polyacrylate, $M_w$=3 500 g/mol, pH=8) is added dropwise under strong stirring (930 rpm) at room temperature (Pendraulik stirrer). Once a stable suspension was obtained, 1.0 part iron nanopowder (6 g, 60-80 nm particle size, Aldrich (China)) was added at room temperature, and stirring was continued for 10 minutes This treatment level corresponds to approx.

2.4 mg/m². The mixture became grey in colour and a stable slurry was obtained (Slurry 11).

2.5 Comparative Examples

2.5.1 Comparative Example 1

Powder CE1

Powder CE1 is a dry ground calcium carbonate from Italy ($d_{50}$=2.6 μm, BET specific surface area=2.6 m²/g).

2.5.2 Comparative Example 2

Powder CE2

Powder CE2 is a dry ground calcium carbonate from Italy ($d_{50}$=1.7 μm, BET specific surface area=3.8 m²/g).

2.5.3 Comparative Example 3

CE3

CE3 is commercially available linoleic acid (Sigma-Aldrich (Germany), technical grade 60-74%).

2.5.4 Comparative Example 4

Powder CE4

Powder CE4 is commercially available (L)-ascorbic acid crystalline powder (Sigma life science, reagent grade, China).

2.5.5 Comparative Example 5

Slurry CE5

To 600 g (100 parts) of wet ground and spray dried marble from Carrara, Italy ($d_{50}$=1.6 μm, BET specific surface area=4.1 m²/g) in a 2 L bottle was added 300 g water and 0.23 parts of a dispersant agent (1.38 g of a 42 wt.-% aqueous solution of a 100% sodium-neutralised polyacrylate, $M_w$=3 500 g/mol, pH=8) is added dropwise under strong stirring (930 rpm) at room temperature (Pendraulik stirrer). After ca 10 minutes stirring, a stable slurry was obtained (Slurry CE5).

2.5.6 Comparative Example 6

CE6

Powder CE6 is commercially available oleic acid (Fluka (Belgium)).

TABLE 1

Overview of prepared surface-treated calcium carbonate-comprising material.

| Example | CaCO₃ (parts) | BET specific surface CaCO₃ (m²/g) | Linoleic acid | Oleic acid | Additive (parts) (L-ascorbic acid) | Gallic acid | elemental Iron |
|---|---|---|---|---|---|---|---|
| 1 | 100 | 2.6 | 0.6 | — | — | — | — |
| 2 | 100 | 2.6 | 1 | — | — | — | — |
| 3 | 100 | 2.6 | 3 | — | — | — | — |
| 4 | 100 | 2.6 | — | 0.6 | — | — | — |
| 5 | 100 | 2.6 | — | 1 | — | — | — |
| 6 | 100 | 2.6 | — | 3 | — | — | — |
| 7 | 100 | 3.8 | — | 1 | — | — | — |
| 8 | 100 | 3.8 | — | — | 1 | — | — |
| 9 | 100 (slurry) | 4.1 | — | — | 1 | — | — |
| 10 | 100 | 2.6 | — | — | — | 1 | — |
| 11 | 100 (slurry) | 4.1 | — | — | — | — | 1 |
| CE1 | 100 | 2.6 | — | — | — | — | — |
| CE2 | 100 | 3.8 | — | — | — | — | — |
| CE3 | — | — | 100 | — | — | — | — |
| CE4 | — | — | — | — | 100 | — | — |
| CE5 | 100 (slurry) | 4.1 | — | — | — | — | — |
| CE6 | — | — | — | 100 | — | — | — |

TABLE 2

Water pick-up.

| Example | Water pick-up (mg/g) |
|---|---|
| CE1 | 1.8 |
| CE2 | 2.8 |
| 2 | 0.7 |
| 4 | 0.4 |
| 5 | 0.5 |
| 6 | 0.7 |
| 7 | 0.6 |

3 Coating Colours Preparation and Paper Coating

Examples 12 to 13 (E12-E13) and Comparative Example 12 (CE12)

Coating colours containing 100 parts of CaCO₃ (w/w) and 6 or 12 parts (dry/dry) of a synthetic binder based on styrene-butadiene copolymers (Styronal D628 (BASF, Germany)) were then prepared with slurries according to Examples 9, 11 and Comparative Example 5 and coated on both sides of superYUPO® foils from Fischer Papier AG, Switzerland (thickness 80 μm, size: 18×26 cm², 62 g/m², polypropylene) and dried on a belt-drier (150° C.). After coating, the sheets were immediately stored in a closed plastic bag to limit oxygen exposure until use. The composition of the coating colours and coating weights are summarized in Table 3 below.

TABLE 3

Coating colour preparation and coating weight.

| Example | Slurry | Coating colour composition | | Solid content [wt.-%] | Coating weight [g/m²] |
| --- | --- | --- | --- | --- | --- |
| | | CaCO₃ [parts] | Styronal D628 [parts, dry/dry] | | |
| CE12 | CE5 | 100 | 6 | 64.8 | 107.8 |
| E12 | E9 | 100 | 12 | 56.7 | 89.3 |
| E13 | E11 | 100 | 6 | 65.6 | 106.1 |

4 Oxygen Scavenging Tests

4.1 Tests on Powders

Oxygen-scavenging tests were performed by placing a defined amount of powder in a well closed desiccator equipped with an oxygen measuring device (GOX 100, GHM Messtechnik GmbH, Germany). The relative amount of oxygen in air is regularly recorded and the total amount of oxygen scavenged by gram of sample estimated, assuming the gas respect the ideal gas law, and neglecting the volume occupied by the powder. Results are expressed as mL $O_2$/g of powder.

4.1.1 Example 14

500 g of the powder from Example 1 were placed in a sealed 7 L desiccator, and $O_2$ amount was recorded regularly. This treatment level corresponds to approx. 2.3 mg/m².

TABLE 4

Oxygen scavenging test.

| Time [h] | 0 | 2 | 4 | 6 | 7.5 | 22 | 25 | 31 | 47 | 55 | 70 |
| --- | --- | --- | --- | --- | --- | --- | --- | --- | --- | --- | --- |
| $O_2$ [%] in desiccator | 20.9 | 20.8 | 20.7 | 20.4 | 20.2 | 18.9 | 18.6 | 18 | 17.5 | 16.9 | 16.9 |
| $O_2$ scavenged (mL/g powder) | 0 | 0.014 | 0.028 | 0.07 | 0.098 | 0.28 | 0.322 | 0.406 | 0.476 | 0.56 | 0.56 |
| $O_2$ scavenged (mL/g linoleic acid) | 0 | 2.35 | 4.70 | 11.74 | 16.44 | 46.98 | 54.03 | 68.12 | 79.87 | 93.96 | 93.96 |

Figure 2:
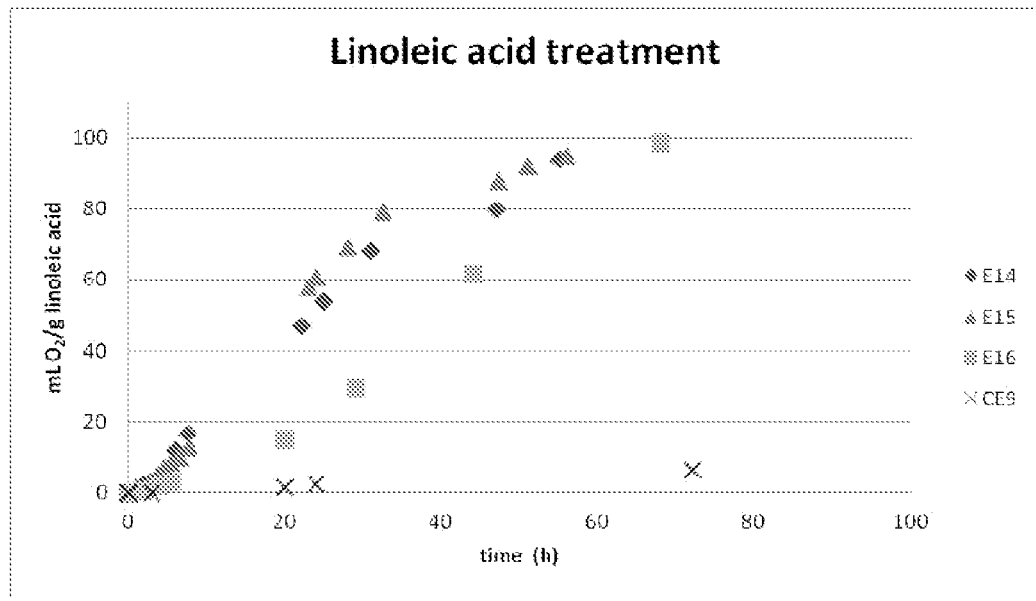

The results of Example 14 are also shown in FIGS. 1 and 2.

4.1.2 Example 15

500 g of the powder from Example 2 were placed in a sealed 7 L desiccator, and the $O_2$ amount was recorded regularly. This treatment level corresponds to approx. 3.8 mg/m².

TABLE 5

Oxygen scavenging test.

| Time [h] | 0 | 1 | 2.5 | 3.5 | 4.6 | 5.5 | 6.5 | 7.75 |
| --- | --- | --- | --- | --- | --- | --- | --- | --- |
| $O_2$ [%] in desiccator | 20.9 | 20.8 | 20.7 | 20.6 | 20.4 | 20.3 | 20.2 | 20 |
| $O_2$ scavenged (mL/g powder) | 0 | 0.014 | 0.028 | 0.042 | 0.07 | 0.084 | 0.098 | 0.126 |
| $O_2$ scavenged (mL/g linoleic acid) | 0 | 1.41 | 2.83 | 4.24 | 7.07 | 8.48 | 9.90 | 12.73 |
| Time [h] | 23 | 24 | 28 | 32.5 | 47.3 | 51 | 56 | 120 |
| $O_2$ [%] in desiccator | 16.8 | 16.6 | 16 | 15.3 | 14.7 | 14.4 | 14.2 | 13.6 |
| $O_2$ scavenged (mL/g powder) | 0.574 | 0.602 | 0.686 | 0.784 | 0.868 | 0.91 | 0.938 | 1.022 |
| $O_2$ scavenged (mL/g linoleic acid) | 57.98 | 60.81 | 69.29 | 79.19 | 87.68 | 91.92 | 94.75 | 103.23 |

The results of Example 15 are also shown in FIGS. 1 and 2.

4.1.3 Example 16

500 g of the powder from Example 3 were placed in a sealed 7 L desiccator, and $O_2$ amount was recorded regularly. This treatment level corresponds to approx. 11.5 mg/m².

TABLE 6

| Oxygen scavenging test. | | | | | | | | |
|---|---|---|---|---|---|---|---|---|
| Time [h] | 0 | 2 | 4 | 5.5 | 20 | 29 | 44 | 68 |
| $O_2$ [%] in desiccator | 20.9 | 20.8 | 20.5 | 20.3 | 17.8 | 14.8 | 8.1 | 0.4 |
| $O_2$ scavenged (mL/g powder) | 0 | 0.014 | 0.056 | 0.084 | 0.434 | 0.854 | 1.792 | 2.87 |
| $O_2$ scavenged (mL/g linoleic acid) | 0 | 0.48 | 1.92 | 2.88 | 14.90 | 29.33 | 61.54 | 98.56 | n.b.: the test was stopped after 68 h as all oxygen in the sealed desiccator had been consumed.

The results of Example 16 are also shown in FIGS. 1 and 2.

4.1.4 Example 17

500 g of the powder from Example 4 were placed in a sealed 7 L desiccator, and $O_2$ amount was recorded regularly. This treatment level corresponds to approx. 2.3 mg/m².

TABLE 7

| Oxygen scavenging test. | | | | | | | | | | |
|---|---|---|---|---|---|---|---|---|---|---|
| Time [h] | 0 | 2 | 5 | 24 | 52 | 74 | 100 | 164 | 172 | 190 |
| $O_2$ [%] in desiccator | 20.9 | 20.9 | 20.9 | 20.8 | 20.6 | 20.6 | 20.5 | 20.2 | 19.8 | 19.8 |
| $O_2$ scavenged (mL/g powder) | 0 | 0 | 0 | 0.014 | 0.042 | 0.042 | 0.056 | 0.098 | 0.154 | 0.154 |
| $O_2$ scavenged (mL/g oleic acid) | 0 | 0 | 0 | 2.35 | 7.05 | 7.05 | 9.40 | 16.44 | 25.84 | 25.84 |
| Time [h] | 194 | 198 | 220 | 239 | 243 | 268 | 334 | 340 | 356 | 364 | 386 |
| $O_2$ [%] in desiccator | 19.7 | 19.6 | 19.5 | 19.3 | 19 | 18.8 | 18.2 | 18.1 | 18.1 | 17.8 | 17.2 |
| $O_2$ scavenged (mL/g powder) | 0.168 | 0.182 | 0.196 | 0.224 | 0.266 | 0.294 | 0.378 | 0.392 | 0.392 | 0.434 | 0.518 |
| $O_2$ scavenged (mL/g oleic acid) | 28.19 | 30.54 | 32.89 | 37.58 | 44.63 | 49.33 | 63.42 | 65.77 | 65.77 | 72.82 | 86.91 |

Figure 3:
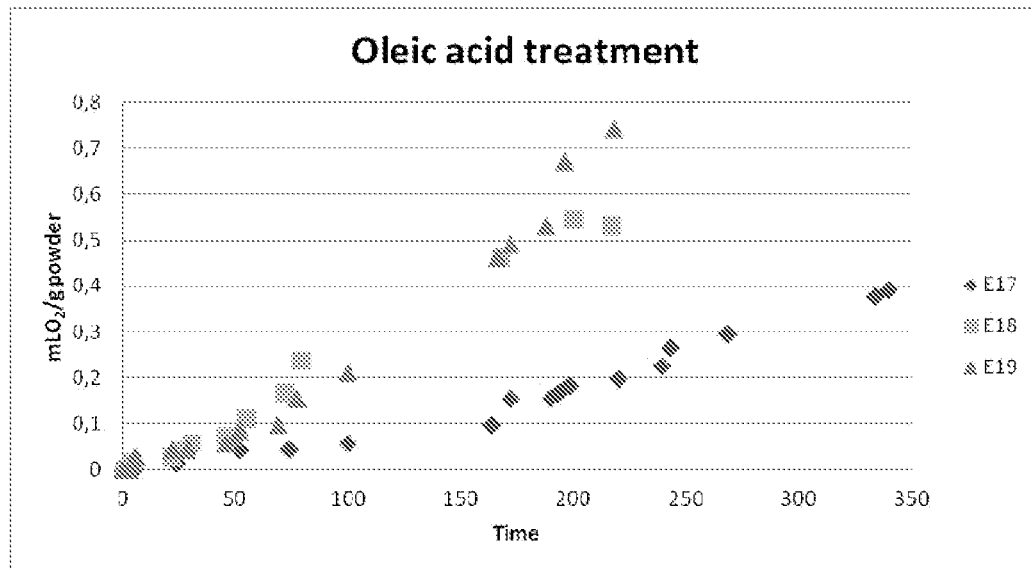
Figure 5:
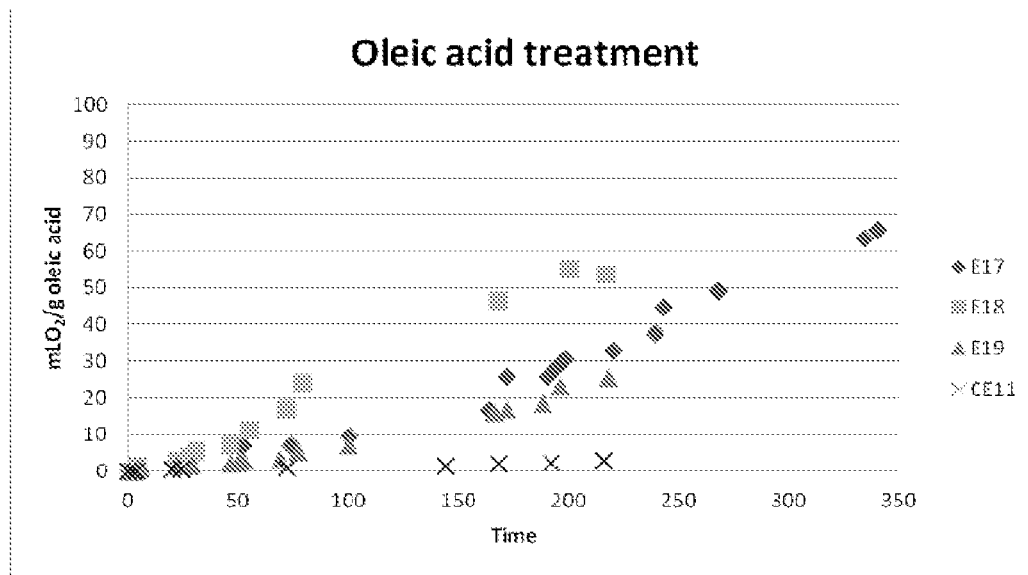

The results of Example 17 are also shown in FIGS. 3 and 5.

4.1.5 Example 18

500 g of the powder from Example 5 were placed in a sealed 7 L desiccator, and $O_2$ amount was recorded regularly. This treatment level corresponds to approx. 3.8 mg/m².

TABLE 8

| Oxygen scavenging test. | | | | | | | | | | | |
|---|---|---|---|---|---|---|---|---|---|---|---|
| Time [h] | 1 | 4 | 22 | 28 | 31 | 46 | 55 | 72 | 79 | 168 | 200 | 217 |
| $O_2$ [%] in desiccator | 20.9 | 20.8 | 20.7 | 20.6 | 20.5 | 20.4 | 20.1 | 19.7 | 19.2 | 17.6 | 17 | 17.1 |
| $O_2$ scavenged (mL/g powder) | 0 | 0.014 | 0.028 | 0.042 | 0.056 | 0.07 | 0.112 | 0.168 | 0.238 | 0.462 | 0.546 | 0.532 |
| $O_2$ scavenged (mL/g oleic acid) | 0 | 1.41 | 2.83 | 4.24 | 5.66 | 7.07 | 11.31 | 16.97 | 24.04 | 46.67 | 55.15 | 53.74 |

The results of Example 18 are also shown in FIGS. 3 and 5.

4.1.6 Example 19

500 g of the powder from Example 6 were placed in a sealed 7 L desiccator, and $O_2$ amount was recorded regularly. This treatment level corresponds to approx. 11.5 mg/m².

TABLE 9

| Oxygen scavenging test. | | | | | | | | | | |
|---|---|---|---|---|---|---|---|---|---|---|
| Time [h] | 0 | 2.5 | 4 | 5.5 | 22 | 29 | 46 | 50 | 52 | 69 |
| $O_2$ [%] in desiccator | 20.9 | 20.9 | 20.8 | 20.7 | 20.6 | 20.6 | 20.5 | 20.4 | 20.3 | 20.2 |
| $O_2$ scavenged (mL/g powder) | 0 | 0 | 0.014 | 0.028 | 0.042 | 0.042 | 0.056 | 0.07 | 0.084 | 0.098 |
| $O_2$ scavenged (mL/g oleic acid) | 0 | 0 | 0.48 | 0.96 | 1.44 | 1.44 | 1.92 | 2.40 | 2.88 | 3.37 |

| Time [h] | 77 | 100 | 166 | 172 | 188 | 196 | 218 |
|---|---|---|---|---|---|---|---|
| $O_2$ [%] in desiccator | 19.8 | 19.4 | 17.6 | 17.4 | 17.1 | 16.1 | 15.6 |
| $O_2$ scavenged (mL/g powder) | 0.154 | 0.21 | 0.462 | 0.49 | 0.532 | 0.672 | 0.742 |
| $O_2$ scavenged (mL/g oleic acid) | 5.29 | 7.21 | 15.87 | 16.83 | 18.27 | 23.08 | 25.48 |

The results of Example 19 are also shown in FIGS. 3 and 5.

4.1.7 Example 20

500 g of the powder from Example 7 were placed in a sealed 7 L desiccator, and $O_2$ amount was recorded regularly. This treatment level corresponds to approx. 2.6 mg/m².

TABLE 10

| Oxygen scavenging test. | | | | | | | | | | | | | |
|---|---|---|---|---|---|---|---|---|---|---|---|---|---|
| Time (h) | 0 | 24 | 48 | 64 | 72 | 88 | 96 | 160 | 168 | 184 | 192 | 216 | 240 |
| $O_2$ [%] in desiccator | 20.9 | 20.7 | 20 | 19.6 | 19.3 | 19.1 | 18.9 | 17.7 | 17.5 | 17.3 | 17 | 16.6 | 15.9 |
| $O_2$ scavenged (mL/g powder) | 0 | 0.028 | 0.126 | 0.182 | 0.224 | 0.252 | 0.28 | 0.448 | 0.476 | 0.504 | 0.546 | 0.602 | 0.7 |
| $O_2$ scavenged (mL/g oleic acid) | 0 | 0 | 12.73 | 18.38 | 22.63 | 25.45 | 28.28 | 45.25 | 48.08 | 50.91 | 55.15 | 60.81 | 70.71 |

| Time (h) | 264 | 328 | 336 | 352 | 360 | 376 | 384 | 400 | 408 | 432 | 504 |
|---|---|---|---|---|---|---|---|---|---|---|---|
| $O_2$ [%] in desiccator | 15.3 | 15.1 | 15 | 14.9 | 14.6 | 14.7 | 14.6 | 14.6 | 14.5 | 14.4 | 14.4 |
| $O_2$ scavenged (mL/g powder) | 0.784 | 0.812 | 0.826 | 0.84 | 0.882 | 0.868 | 0.882 | 0.882 | 0.896 | 0.91 | 0.91 |
| $O_2$ scavenged (mL/g oleic acid) | 79.19 | 82.02 | 83.43 | 84.85 | 89.09 | 87.68 | 89.09 | 89.09 | 90.51 | 91.92 | 91.92 |

Figure 4:
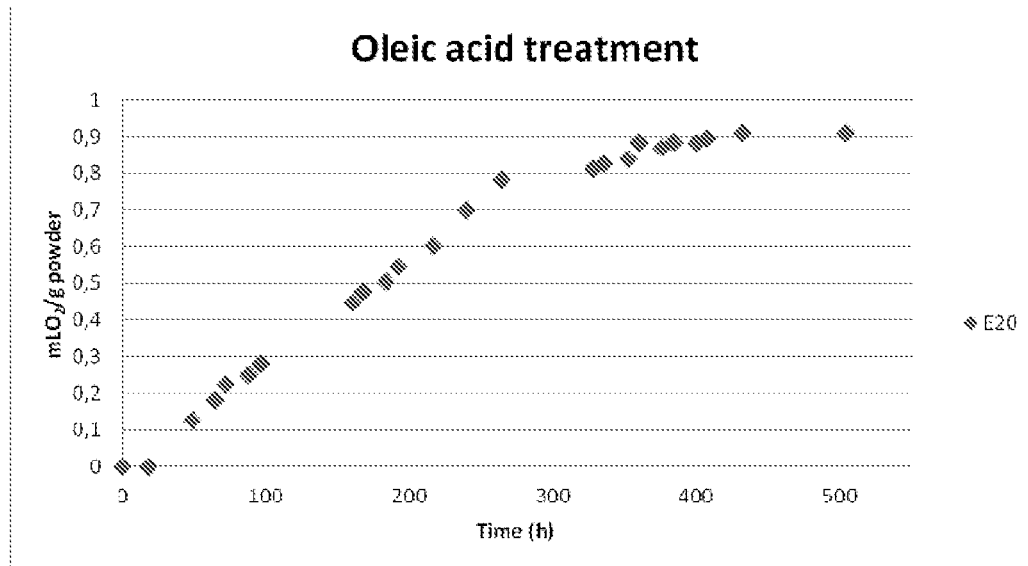
Figure 6:
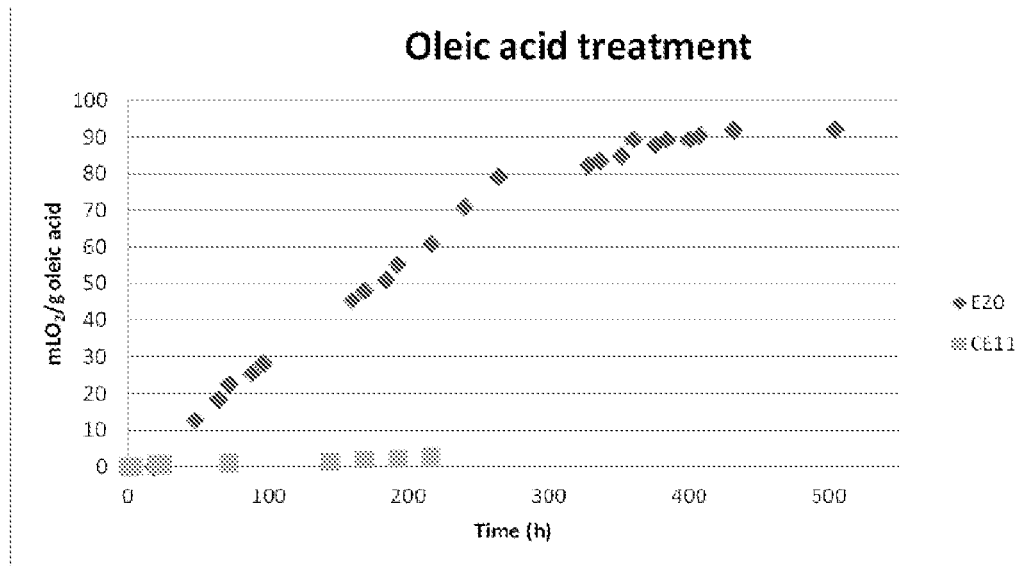

The results of Example 20 are also shown in FIGS. 4 and 6.

4.1.8 Example 21

500 g of the powder from Example 8 were placed in a sealed 7 L desiccator, and $O_2$ amount was recorded regularly. This treatment level corresponds to approx. 2.6 mg/m$^2$.

TABLE 11

| Oxygen scavenging test. | | | | | | | | |
| --- | --- | --- | --- | --- | --- | --- | --- | --- |
| Time [h] | 0 | 16 | 20 | 24 | 40 | 45 | 48 | 64 | 72 |
| $O_2$ [%] in desiccator | 20.9 | 19.4 | 19 | 18.5 | 17.7 | 17.4 | 17.2 | 16.6 | 16.2 |
| $O_2$ scavenged (mL/g powder) | 0 | 0.21 | 0.266 | 0.336 | 0.448 | 0.49 | 0.518 | 0.602 | 0.658 |
| $O_2$ scavenged (mL/g ascorbic acid) | 0 | 21.21 | 26.87 | 33.94 | 45.25 | 49.49 | 52.32 | 60.81 | 66.46 |

| Time [h] | 136 | 168 | 192 | 312 |
| --- | --- | --- | --- | --- |
| $O_2$ [%] in desiccator | 15.5 | 15 | 14.9 | 15.1 |
| $O_2$ scavenged (mL/g powder) | 0.756 | 0.826 | 0.84 | 0.812 |
| $O_2$ scavenged (mL/g ascorbic acid) | 76.36 | 83.43 | 84.85 | 82.02 |

Figure 7:
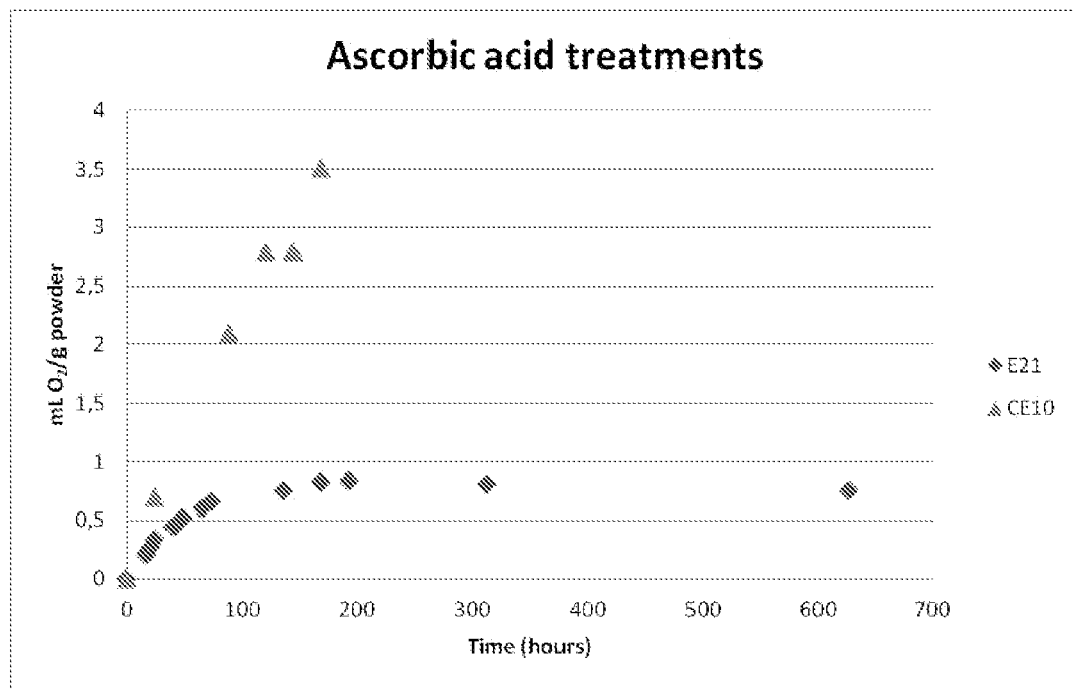
Figure 8:
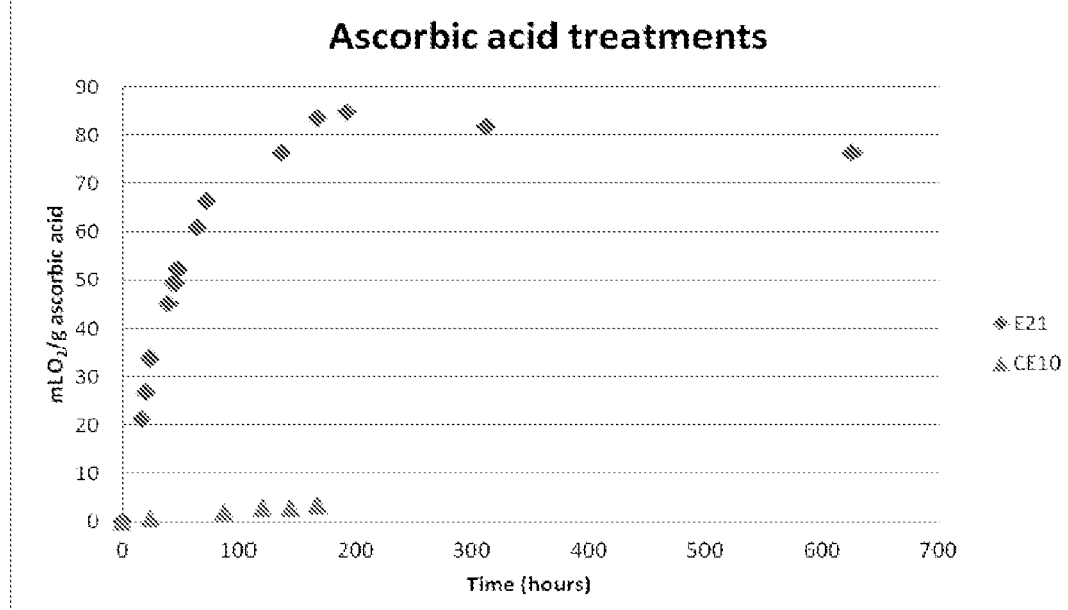

The results of Example 21 are also shown in FIGS. 7 and 8.

4.1.9 Example 22

500 g of the powder from Example 10 were placed in a sealed 7 L desiccator, and $O_2$ amount was recorded regularly. This treatment level corresponds to approx. 3.8 mg/m$^2$.

TABLE 12

| Oxygen scavenging test. | | | | | | | | | | |
| --- | --- | --- | --- | --- | --- | --- | --- | --- | --- | --- |
| Time [h] | 0 | 24 | 48 | 72 | 168 | 312 | 360 | 480 | 524 | 740 | 938 |
| $O_2$ [%] in desiccator | 20.9 | 20.7 | 20.6 | 20.6 | 20.3 | 20.2 | 20 | 19.9 | 19.8 | 19.8 | 19.9 |
| $O_2$ scavenged (mL/g powder) | 0 | 0.028 | 0.042 | 0.042 | 0.084 | 0.098 | 0.126 | 0.14 | 0.154 | 0.154 | 0.14 |
| $O_2$ scavenged (mL/g gallic acid) | 0 | 2.83 | 4.24 | 4.24 | 8.48 | 9.90 | 12.73 | 14.14 | 15.56 | 15.56 | 14.14 |

Figure 9:
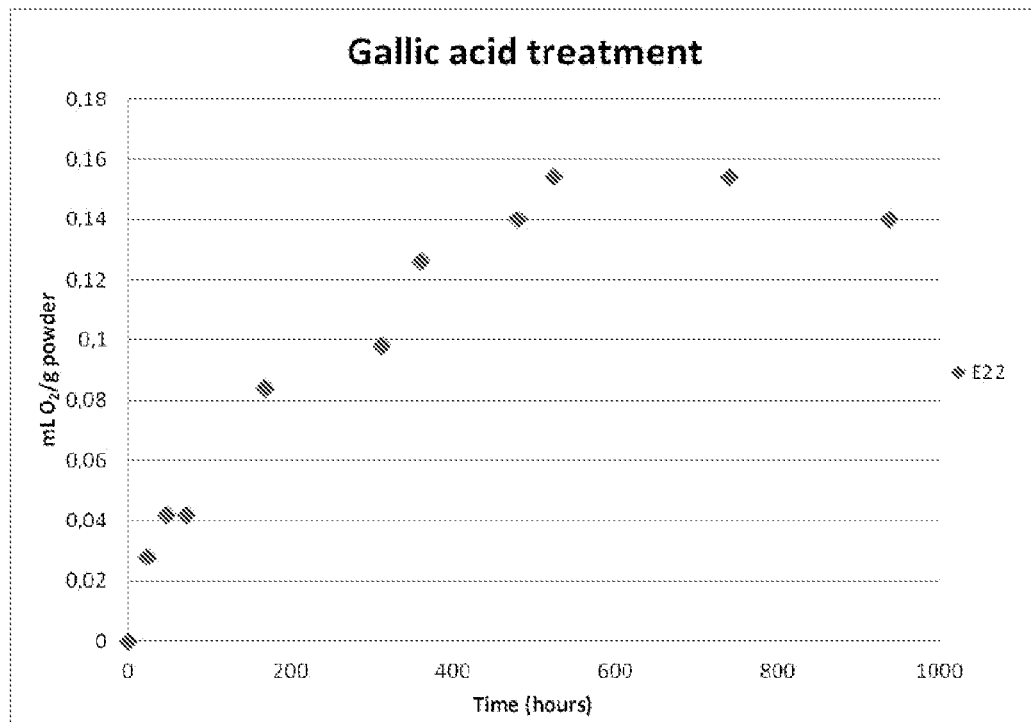

The results of Example 22 are also shown in FIG. 9.

4.1.10 Comparative Example 7

500 g of the powder from example CE1 were placed in a sealed 7 L desiccator, and $O_2$ amount was recorded regularly. No noticeable change in $O_2$ levels could be noticed after 2 weeks.

TABLE 13

| Oxygen scavenging test. | | | | | | | | | | |
|---|---|---|---|---|---|---|---|---|---|---|
| Time (h) | 0 | 3 | 20 | 24 | 72 | 144 | 168 | 192 | 216 | 240 |
| $O_2$ [%] in desiccator | 20.9 | 20.9 | 20.9 | 20.8 | 20.9 | 20.9 | 20.9 | 20.8 | 20.9 | 20.9 |
| $O_2$ absorbed (mL/g powder) | 0 | 0 | 0 | 0.014 | 0 | 0 | 0 | 0.014 | 0 | 0 |

The results of comparative Example 7 are also shown in FIG. 1.

4.1.11 Comparative Example 8

500 g of the powder from example CE2 were placed in a sealed 7 L desiccator, and $O_2$ amount was recorded regularly. No noticeable change in $O_2$ levels could be noticed after 2 weeks.

4.1.12 Comparative Example 9

14.5 g of linoleic acid (CE3) were put in a 50 mL beaker and placed in a sealed 7 L desiccator, and $O_2$ amount was recorded regularly.

TABLE 14

| Oxygen scavenging test. | | | | | | | | | |
|---|---|---|---|---|---|---|---|---|---|
| Time (h) | 0 | 3 | 20 | 24 | 72 | 144 | 168 | 192 | 216 |
| $O_2$ [%] in desiccator | 20.9 | 20.9 | 20.6 | 20.4 | 19.6 | 17.6 | 16.6 | 15.6 | 14.9 |
| $O_2$ scavenged (mL/g linoleic acid) | 0 | 0 | 1.45 | 2.41 | 6.28 | 15.93 | 20.76 | 25.59 | 28.97 |

The results of comparative Example 9 are also shown in FIG. 2.

4.1.13 Comparative Example 10

10 g of (L)-ascorbic acid crystalline powder (Sigma life science, reagent grade, China, powder CE4) were placed in a sealed 7 L desiccator, and $O_2$ amount was recorded regularly.

TABLE 15

| Oxygen scavenging test. | | | | | | |
|---|---|---|---|---|---|---|
| Time [h] | 0 | 24 | 88 | 120 | 144 | 168 |
| $O_2$ [%] in desiccator | 20.9 | 20.8 | 20.6 | 20.5 | 20.5 | 20.4 |
| $O_2$ scavenged (mL/g ascorbic acid) | 0 | 0.7 | 2.1 | 2.8 | 2.8 | 3.5 |

The results of comparative Example 10 are also shown in FIGS. 7 and 8.

4.1.13 Comparative Example 11

14.5 g of oleic acid (CE6) were placed in a sealed 7 L desiccator, and $O_2$ amount was recorded regularly.

TABLE 16

| Oxygen scavenging test. | | | | | | | | | |
|---|---|---|---|---|---|---|---|---|---|
| Time (h) | 0 | 3 | 20 | 24 | 72 | 144 | 168 | 192 | 216 |
| $O_2$ [%] in desiccator | 20.9 | 20.9 | 20.8 | 20.8 | 20.7 | 20.6 | 20.5 | 20.4 | 20.3 |
| $O_2$ scavenged (mL/g oleic acid) | 0 | 0 | 0.48 | 0.48 | 0.97 | 1.45 | 1.93 | 2.41 | 2.90 |

The results of comparative Example 11 are also shown in FIGS. 5 and 6.

4.2 Tests on Coated Papers

4.2.1 Example 23

Paper from E12 (with Ascorbic Acid)

80 strips (5×18 cm²) of coated paper E12 are cut in smaller pieces (each strip was cut in 4) and placed in a sealed 2.9 L desiccator, and $O_2$ amount was recorded regularly. The estimated amount of coating (by weight) used for this test was 64 g.

TABLE 17

| | Oxygen scavenging test. | | | | | | | | |
|---|---|---|---|---|---|---|---|---|---|
| Time [h] | 0 | 15 | 18 | 21 | 24 | 40 | 44 | 120 | 168 |
| $O_2$ [%] in desiccator | 20.9 | 19.7 | 19.4 | 19 | 18.7 | 17.8 | 17.6 | 17.3 | 17.3 |
| $O_2$ scavenged (mL/g coating) | 0 | 0.54 | 0.68 | 0.86 | 1.00 | 1.41 | 1.450 | 1.63 | 1.63 |

Figure 10:
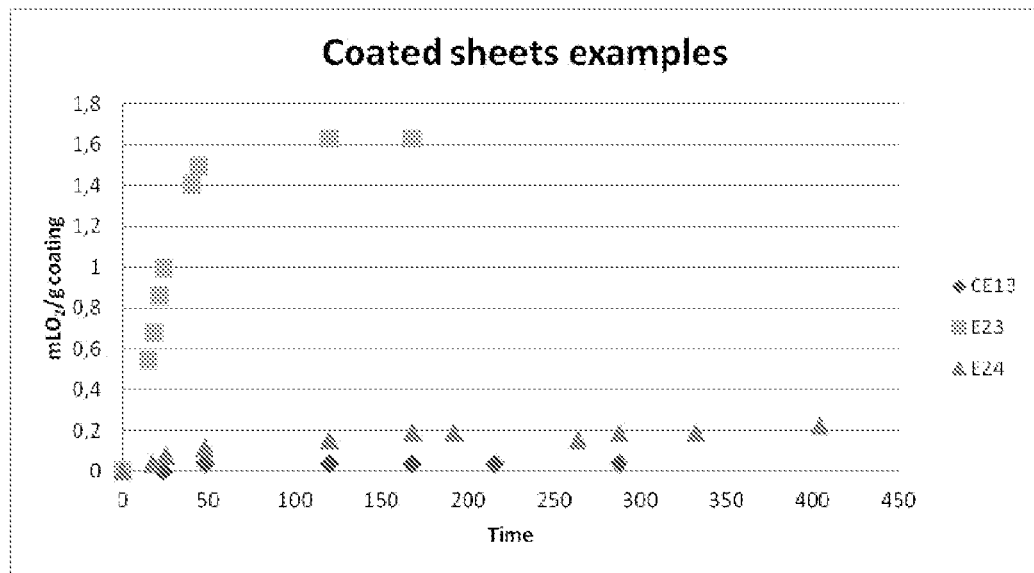

The results of Example 23 are also shown in FIG. 10.

4.2.2 Example 24

Paper from E13 (with Elemental Iron)

80 strip (5×18 cm²) of coated paper E13 are cut in smaller pieces (each strip was cut in 4) and placed in a sealed 2.9 L desiccator, and $O_2$ amount was recorded regularly. The estimated amount of coating (by weight) used for this test was 77 g.

TABLE 18

| | Oxygen scavenging test. | | | | | | | | |
|---|---|---|---|---|---|---|---|---|---|
| Time [h] | 0 | 17 | 25 | 48 | 120 | 168 | 192 | 288 | 332 | 404 |
| $O_2$ [%] in desiccator | 20.9 | 20.8 | 20.7 | 20.6 | 20.5 | 20.4 | 20.4 | 20.4 | 20.4 | 20.3 |
| $O_2$ scavenged (mL/g coating) | 0 | 0.037 | 0.075 | 0.113 | 0.151 | 0.188 | 0.188 | 0.188 | 0.188 | 0.226 |

The results of Example 24 are also shown in FIG. 10.

4.2.3 Comparative Example 13

Paper from CE12 (Comparative Example)

108 strips (5×18 cm²) of coated paper CE12 are cut in smaller pieces (each strip was cut in 4) and placed in a sealed 2.9 L desiccator, and $O_2$ amount was recorded regularly. The estimated amount of coating (by weight) used for this test was 84 g.

TABLE 19

| | Oxygen scavenging test. | | | | | |
|---|---|---|---|---|---|---|
| Time [h] | 0 | 24 | 48 | 120 | 168 | 216 | 288 |
| $O_2$ [%] in desiccator | 20.9 | 20.9 | 20.8 | 20.8 | 20.8 | 20.8 | 20.8 |
| $O_2$ scavenged (mL/g coating) | 0 | 0 | 0.035 | 0.035 | 0.035 | 0.035 | 0.035 |

The results of comparative Example 13 are also shown in FIG. 10.

All of the examples show that high $O_2$ scavenging values can be achieved with the surface-treated calcium carbonate-comprising material and/or magnesium carbonate-comprising material. Thus, the reaction with $O_2$ can be enhanced by using the treatment agent, possibly through an increased available surface area.

The invention claimed is:

1. A product comprising a surface-treated calcium carbonate-comprising material and/or magnesium carbonate-comprising material as an oxygen scavenger;
   wherein the at least one calcium carbonate-comprising material and/or magnesium carbonate-comprising material is selected from the group consisting of ground calcium carbonate, marble, dolomitic marble, magnesitic marble, limestone, chalk, precipitated calcium carbonate, vaterite, calcite, aragonite, dolomite, and mixtures thereof;
   wherein the surface treatment agent is selected from the group consisting of gallic acid and/or salts thereof, elemental iron, iron (II)-salts and iron (II)-comprising oxides, iron (II, III)-comprising oxides and mixtures thereof; and
   wherein the total weight of the surface treatment agent on the total surface area of the at least one calcium carbonate-comprising material and/or magnesium carbonate-comprising material is from 2.3 to 40 mg/m², based on the at least one calcium carbonate-comprising material and/or magnesium carbonate-comprising material.

2. The product according to claim 1, wherein the at least one calcium carbonate-comprising material and/or magnesium carbonate-comprising material is selected from the group consisting of ground calcium carbonate, marble, dolomitic marble, magnesitic marble, limestone, chalk, precipitated calcium carbonate, and mixtures thereof.

3. The product according to claim 1, wherein the at least one calcium carbonate-comprising material and/or magnesium carbonate-comprising material is selected from the group consisting of dolomitic marble, magnesitic marble, limestone, chalk, and mixtures thereof.

4. The product according to claim 1, wherein the at least one calcium carbonate-comprising material and/or magnesium carbonate-comprising material is ground calcium carbonate.

5. The product according to claim 1, wherein the specific surface area (BET) of the at least one calcium carbonate-comprising material and/or magnesium carbonate-comprising material is from 0.5 to 150 m²/g, as measured using nitrogen and the BET method according to ISO 9277:2010.

6. The product according to claim 1, wherein the specific surface area (BET) of the at least one calcium carbonate-comprising material and/or magnesium carbonate-comprising material is from 1.5 to 15 m²/g, as measured using nitrogen and the BET method according to ISO 9277:2010.

7. The product according to claim 1, wherein the total weight of the surface treatment agent on the total surface area of the at least one surface-treated calcium carbonate-comprising material and/or magnesium carbonate-comprising material is from 2.3 to 20 mg/m², based on the at least one calcium carbonate-comprising material and/or magnesium carbonate-comprising material.

8. The product according to claim 1, wherein the total weight of the surface treatment agent on the total surface area of the at least one surface-treated calcium carbonate-comprising material and/or magnesium carbonate-comprising material is from 2.3 to 15 mg/m², based on the at least one calcium carbonate-comprising material and/or magnesium carbonate-comprising material.

9. The product according to claim 1, wherein the moisture pick up susceptibility of the surface-treated calcium carbonate-comprising material and/or magnesium carbonate-comprising material is from 0.05 to 20 mg/g.

10. The product according to claim 1, wherein the moisture pick up susceptibility of the surface-treated calcium carbonate-comprising material and/or magnesium carbonate-comprising material is from 0.2 to 10 mg/g.

11. The product according to claim 1, wherein the iron is a particulate powder iron having a volume median particle size $d_{50}$ ranging from 5 nm to 10 µm.

12. The product according to claim 1, wherein the iron is a particulate powder iron having a volume median particle size $d_{50}$ ranging from 30 nm to 500 nm.

13. The product according to claim 1, wherein the at least one calcium carbonate-comprising material and/or magnesium carbonate-comprising material is additionally treated with another additive, a dispersant, a polyacrylate dispersant, a binder and/or an activating agent.

14. The product according to claim 1, wherein the total volume of oxygen reacted per gram of surface treatment agent is in the range from 0.01 to 10 mL per gram of surface treatment agent per day, wherein the reaction with oxygen is carried out with 500 g dried surface-treated calcium carbonate-comprising material and/or magnesium carbonate-comprising material in a closed desiccator with a volume of 7 L filled with air under normal pressure.

15. The product according to claim 1, wherein the total volume of oxygen reacted per gram of surface treatment agent is in the range from 0.4 to 6 mL per gram of surface treatment agent per day, wherein the reaction with oxygen is carried out with 500 g dried surface-treated calcium carbonate-comprising material and/or magnesium carbonate-comprising material in a closed desiccator with a volume of 7 L filled with air under normal pressure.

16. The product according to claim 1, wherein the surface-treated calcium carbonate-comprising material and/or magnesium carbonate-comprising material further comprises at least one supplemental agent which is a hydrophobising agent, which at least partially covers the surface-treated calcium carbonate-comprising material and/or magnesium carbonate-comprising material, wherein the total weight of the at least one hydrophobising agent on the total surface area of the surface-treated calcium carbonate-comprising material and/or magnesium carbonate-comprising material is from 0.001 to 10 mg/m², based on the at least one calcium carbonate-comprising material and/or magnesium carbonate-comprising material.

17. The product according to claim 1, wherein the surface-treated calcium carbonate-comprising material and/or magnesium carbonate-comprising material further comprises at least one supplemental agent which is a hydrophobising agent, which at least partially covers the surface-treated calcium carbonate-comprising material and/or magnesium carbonate-comprising material, wherein the total weight of the at least one hydrophobising agent on the total surface area of the surface-treated calcium carbonate-comprising material and/or magnesium carbonate-comprising material is from 0.1 to 4 mg/m², based on the at least one calcium carbonate-comprising material and/or magnesium carbonate-comprising material.

18. The product according to claim 16, wherein the surface-treated calcium carbonate-comprising material and/or magnesium carbonate-comprising material comprises at least one supplemental agent which is a hydrophobising agent selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, polyhydrogensiloxane and reaction products thereof, an inert silicone oil, polydimethylsiloxane, and mixtures thereof.

19. The product according to claim 17, wherein the surface-treated calcium carbonate-comprising material and/or magnesium carbonate-comprising material comprises at least one supplemental agent which is a hydrophobising agent selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, polyhydrogensiloxane and reaction products thereof, an inert silicone oil, polydimethylsiloxane, and mixtures thereof.

20. The product according to claim 1, wherein the product is selected from the group consisting of polymer compositions, coatings, polymer or paper coatings, food applications, food packaging applications, filters and/or cosmetic applications.

* * * * *